US006609807B2

(12) United States Patent
Torihara et al.

(10) Patent No.: US 6,609,807 B2
(45) Date of Patent: Aug. 26, 2003

(54) BACKLIGHT AND LIQUID CRYSTAL DISPLAY DEVICE

(75) Inventors: Hiroshi Torihara, Matsusaka (JP); Nobuyuki Takahashi, Kashiba (JP); Kenichi Ukai, Uda-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/921,753

(22) Filed: Aug. 6, 2001

(65) Prior Publication Data
US 2002/0018341 A1 Feb. 14, 2002

(30) Foreign Application Priority Data
Aug. 7, 2000 (JP) ........................... 2000-237884
Jun. 19, 2001 (JP) ........................... 2001-184841

(51) Int. Cl.[7] ............................................. F21V 7/04
(52) U.S. Cl. ..................... 362/31; 362/561; 362/290; 362/339
(58) Field of Search ..................... 362/26, 31, 561, 362/290, 339, 342, 321, 325

(56) References Cited
U.S. PATENT DOCUMENTS

| 5,295,221 | A | | 3/1994 | Roslan ........................ 385/147 |
| 5,890,791 | A | * | 4/1999 | Saito ............................ 362/31 |
| 6,312,787 | B1 | * | 11/2001 | Hayashi et al. ............. 362/331 |
| 6,425,675 | B2 | * | 7/2002 | Onishi et al. ................. 362/31 |
| 6,467,922 | B1 | * | 10/2002 | Blanc et al. .................. 362/31 |
| 6,502,947 | B2 | * | 1/2003 | Matsumoto et al. .......... 362/31 |

FOREIGN PATENT DOCUMENTS

| EP | 0 607 930 A | 4/2000 |
| JP | 11-190841 | 7/1999 |
| WO | 00/19145 | 4/2000 |

OTHER PUBLICATIONS

Tai et al, "Flat Collimator: A Backlighting Assembly Utilizing Microprisms for High Energy Efficiency", SID International Symposium Digest of Applications Papers, San Jose, Jun. 14–16, 1994, Santa Ana, SID, US, vol. 25, Jun. 14, 1994, pp. 10–13.

* cited by examiner

Primary Examiner—Y. My Quach-Lee
Assistant Examiner—Peggy A. Neils
(74) Attorney, Agent, or Firm—Nixon & Vanderhye, P.C.

(57) ABSTRACT

A backlight 7 has light sources 2, a flat-plate-shaped light guide plate 3 for guiding the light emitted from the light sources 2 in a predetermined direction, a light shield louver 5, disposed so as to face the light guide plate 3, for shielding part of the light emerging from the light guide plate 3 according to angles of incidence, and a prism sheet 8 for converting the brightness distribution of the light incident on the light shield louver 5 into a predetermined brightness distribution. Owing to the prism sheet 8, the light incident on the light shield louver exhibits a brightness distribution such that brightness is at a minimum at an angle of incidence of 0°. Thus, the backlight 7, and a liquid crystal display device 1 employing it, permits light to emerge therefrom within a desired range of viewing angles while offering high brightness within that range, with reduced degradation of viewability.

27 Claims, 21 Drawing Sheets

BACKLIGHT AND LIQUID CRYSTAL DISPLAY DEVICE

BACKGROUND OF THE INVENTION

1. Field of the Invention

The present invention relates to a backlight for illuminating a transmissive liquid crystal panel and to a liquid crystal display device having such a backlight. The present invention relates particularly to a backlight and a liquid crystal display device that permit the viewing of a displayed image only within a particular range of viewing angles.

2. Description of the Prior Art

A liquid crystal display device having a transmissive liquid crystal panel is so structured as to produce a desired image by illuminating the liquid crystal panel from behind with a backlight so that light is transmitted through particular pixels of the liquid crystal panel. This permits the viewing of a displayed image even, for example, at night when no ambient light is available.

A liquid crystal display device designed for use in a navigation system mounted on a car, an automated teller machine (ATM) installed at a banking institution, or the like is so configured as to permit the viewing of a displayed image only from a viewpoint within a particular range of viewing angles so that the displayed image cannot be viewed from a viewpoint outside that range of viewing angles. This is because, with a liquid crystal display device for car-mounted use, the range of angles of emergence of the light emerging therefrom is limited because, if an image displayed thereon is projected onto the windshield of the car, it may disturb the field of vision of the driver and lead to a car accident. On the other hand, with a liquid crystal display device for use in an ATM, the range of angles of emergence of the light emerging therefrom is limited so that no one can view the information displayed on the liquid crystal panel other than the one who is operating the ATM.

FIG. 26 shows the structure of a conventional liquid crystal display device that can control the range of angles of emergence of the light emerging therefrom. The liquid crystal display device 1 is composed essentially of a liquid crystal panel 6 and a backlight 7. The backlight 7 has a light guide plate 3 covered with a reflector sheet 4 made of polyethylene terephthalate (PET) foam. Along opposite sides of the light guide plate 3, light sources 2 are supported by a supporting member (not shown). The back surface 3b of the light guide plate 3 is formed as a non-glossy surface, so that the light emitted from the light sources 2 is incident on the light guide plate 3 and then emerges therefrom through its exit surface 3a as scattered light.

Above the light guide plate 3 are arranged a diffuser sheet 20 for producing diffused light and a light shield louver 5 for shielding the light incident within a predetermined range of angles. As shown in FIG. 27, the light shield louver 5 has light-transmitting layers 5a, which transmit light, and light-absorbing layers 5b, which absorb light, arranged, for example, at 50 μm intervals and sandwiched between transparent base plates 5c. Thus, of the light incident on the light shield louver 5, the portion traveling within a range θ of viewing angles is transmitted, but the portion traveling outside the range θ of viewing angles is shielded.

Above the light shield louver 5, a transmissive liquid crystal panel 6 is disposed. The light traveling within the range θ of viewing angles (see FIG. 27) and thus transmitted through the light shield louver 5 illuminates the liquid crystal panel 6, and is transmitted through particular pixels thereof so as to form an image. As a result, the image can be viewed from a viewpoint within a predetermined range of directions.

However, the conventional liquid crystal display device 1 described above, for example when it offers a range θ of viewing angles of 90°, exhibits transmittance as shown in FIG. 29. In this figure, the angle of incidence (°) with respect to the light shield louver 5 is taken along the horizontal axis, and the transmittance (%) is taken along the vertical axis. As this figure shows, the transmittance is highest at an angle of incidence of 0°, and the transmittance linearly decreases as the absolute value of the angle of incidence increases.

Owing to the characteristics of the backlight 7 shown in FIG. 26, the light emerging from the light guide plate 3 exhibits a brightness distribution as shown in FIG. 28, offering the highest brightness around an angle of incidence of 0° with respect to the light shield louver 5. As a result, the light transmitted through the light shield louver 5 and then incident on the liquid crystal panel 6 exhibits a brightness distribution as shown in FIG. 30.

In FIG. 28, the angle of incidence (°) with respect to the light shield louver 5 is taken along the horizontal axis, and the relative brightness (%) relative to the brightness (100%) at an angle of incidence of 0° is taken along the vertical axis. In FIG. 30, the angle of emergence (°) with respect to the light shield louver 5 is taken along the horizontal axis, and the relative brightness (%) relative to the brightness (100%) at an angle of emergence of 0° is taken along the vertical axis.

As FIG. 30 shows, the brightness is highest at an angle of emergence of 0°, and the brightness falls sharply as the absolute value of the angle of emergence increases. This is the reason that, as the viewpoint of the viewer varies according to his or her height, sitting height, or the like, the viewability of the liquid crystal display device 1 degrades markedly.

Moreover, in the production of the light shield louver 5, errors are inevitable in the intervals at which the light-transmitting layers 5a and the light-absorbing layers 5b are arranged. As a result, as shown in FIG. 31, when the liquid crystal display device 1 is viewed from the directions indicated by arrows P1 and P2, part of the viewer's lines of sight are shielded by the light-absorbing layers 5b as arrow P2 indicates. This causes black stripes to be observed by the viewer, and thus degrades the viewability of the liquid crystal display device 1.

SUMMARY OF THE INVENTION

An object of the present invention is to provide a backlight and a liquid crystal display device that permit the viewing of a displayed image within a desired range of viewing angles with reduced degradation of viewability.

To achieve the above object, according to one aspect of the present invention, a backlight is provided with: a light source; a flat-plate-shaped light guide plate for guiding the light emitted from the light source in a predetermined direction; a light shield louver, disposed so as to face the light guide plate, for shielding part of the light emerging from the light guide plate according to angles of incidence; and a converter for converting the brightness distribution of the light incident on the light shield louver into a predetermined brightness distribution. Here, the brightness distribution of the light incident on the light shield louver is converted in such a way that the brightness at a predetermined angle of incidence within the range from 0° to +90° and the brightness at a predetermined angle of incidence within the range from 0° to −90° are higher than the brightness at an angle of incidence of 0°.

In this configuration, the light emitted from the light source is guided to the light shield louver by the light guide plate. The light incident on the light shield louver is converted so as to have a predetermined brightness distribution by the converter before or after the light emerges from the light guide plate. The light thus converted exhibits the highest brightness in both the positive and negative directions relative to an angle of incidence of 0°, at which the brightness is lower than the highest brightness.

In the backlight configured as described above, the converter may be composed of prisms arranged at predetermined intervals.

According to another aspect of the present invention, a backlight is provided with: a light source; a flat-plate-shaped light guide plate for guiding the light emitted from the light source in a predetermined direction; a light shield louver, disposed so as to face the light guide plate, for shielding part of the light emerging from the light guide plate according to angles of incidence; and a converter for converting the brightness distribution of the light incident on the light shield louver into a predetermined brightness distribution. Here, the converter shifts the average direction of incidence of the light incident on the light shield louver from the direction normal to the light shield louver.

In this configuration, the light emitted from the light source is guided to the light shield louver by the light guide plate. The light incident on the light shield louver is converted so as to have a predetermined brightness distribution by the converter before or after the light emerges from the light guide plate. The light is incident on the light shield louver from a direction shifted from the direction normal to the light shield louver. Here, the average direction of incidence means the direction indicated by the average of angles at which light is incident on the light shield louver.

In the backlight configured as described above, the converter may have a Fresnel sheet having a sawtooth-shaped section.

In the backlight configured as described above, the brightness distribution of the light incident on the light shield louver may be converted in such a way that the brightness at a predetermined angle of incidence in the positive direction relative to the average angle of incidence and the brightness at a predetermined angle of incidence in the negative direction relative to the average angle of incidence are higher than the brightness at the average angle of incidence.

In this configuration, the light incident on the light shield louver exhibits the highest brightness in both the positive and negative directions relative to the average angle of incidence, at which the brightness is lower than the highest brightness. Here, the average angle of incidence means the average of angles at which light is incident on the light shield louver.

In the backlight configured as described above, the light source may emit varying amounts of light according to directions of emergence. This configuration permits the amount of light emerging from the backlight outside the desired range of angles to be reduced, and thus helps save electric power.

According to another aspect of the present invention, a liquid crystal display device is provided with: a backlight including a light source, a flat-plate-shaped light guide plate for guiding the light emitted from the light source in a predetermined direction, a light shield louver, disposed so as to face the light guide plate, for shielding part of the light emerging from the light guide plate according to angles of incidence, and a converter for converting the brightness distribution of the light incident on the light shield louver into a predetermined brightness distribution; and a liquid crystal panel that displays an image by transmitting the light emerging from the backlight. Here, the brightness distribution of the light incident on the light shield louver is converted in such a way that the brightness at a predetermined angle of incidence within the range from 0° to +90° and the brightness at a predetermined angle of incidence within the range from 0° to −90° are higher than the brightness at an angle of incidence of 0°.

According to another aspect of the present invention, a liquid crystal display device is provided with: a backlight including a light source, a flat-plate-shaped light guide plate for guiding the light emitted from the light source in a predetermined direction, a light shield louver, disposed so as to face the light guide plate, for shielding part of the light emerging from the light guide plate according to angles of incidence, and a converter for converting the brightness distribution of the light incident on the light shield louver into a predetermined brightness distribution; and a liquid crystal panel that displays an image by transmitting the light emerging from the backlight. Here, the converter shifts the average direction of incidence of the light incident on the light shield louver from the direction normal to the light shield louver.

According to another aspect of the present invention, a liquid crystal display device is provided with: a backlight including a light source, a flat-plate-shaped light guide plate for guiding the light emitted from the light source in a predetermined direction, a light shield louver, disposed so as to face the light guide plate, for shielding part of the light emerging from the light guide plate according to angles of incidence, and a converter for converting the brightness distribution of the light incident on the light shield louver into a predetermined brightness distribution; and a liquid crystal panel that displays an image by transmitting the light emerging from the backlight. Here, the converter performs conversion in such a way that the light emerging from the light shield louver exhibits a brightness distribution such that, assuming that the brightness at an angle of emergence of 0° is X and the absolute value of the angle of emergence at which the brightness is 0.1X is α, the brightness at an angle of incidence of which the absolute value is α/2 is 0.55X or higher.

In this configuration, the light emitted from the light source is guided to the light shield louver by the light guide plate. The light incident on the light shield louver is converted so as to have a predetermined brightness distribution by the converter before or after the light emerges from the light guide plate. The transmittance of the light shield louver is highest at an angle of incidence of 0°, and linearly decreases as the angle of incidence increases until it becomes substantially 0% at the limits of the range of viewing angles. The light emerging from the light shield louver, of which the angle of emergence is controlled in this way, is incident on the liquid crystal panel. Here, if the effective range of viewing angles is defined as the range in which brightness is 10% or more of the brightness at an angle of emergence of 0° with respect to the light shield louver, within a range of angles that corresponds to half the effective range of viewing angles, brightness is amplified by the converter so as to be 55% or more of the brightness at an angle of emergence of 0°.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
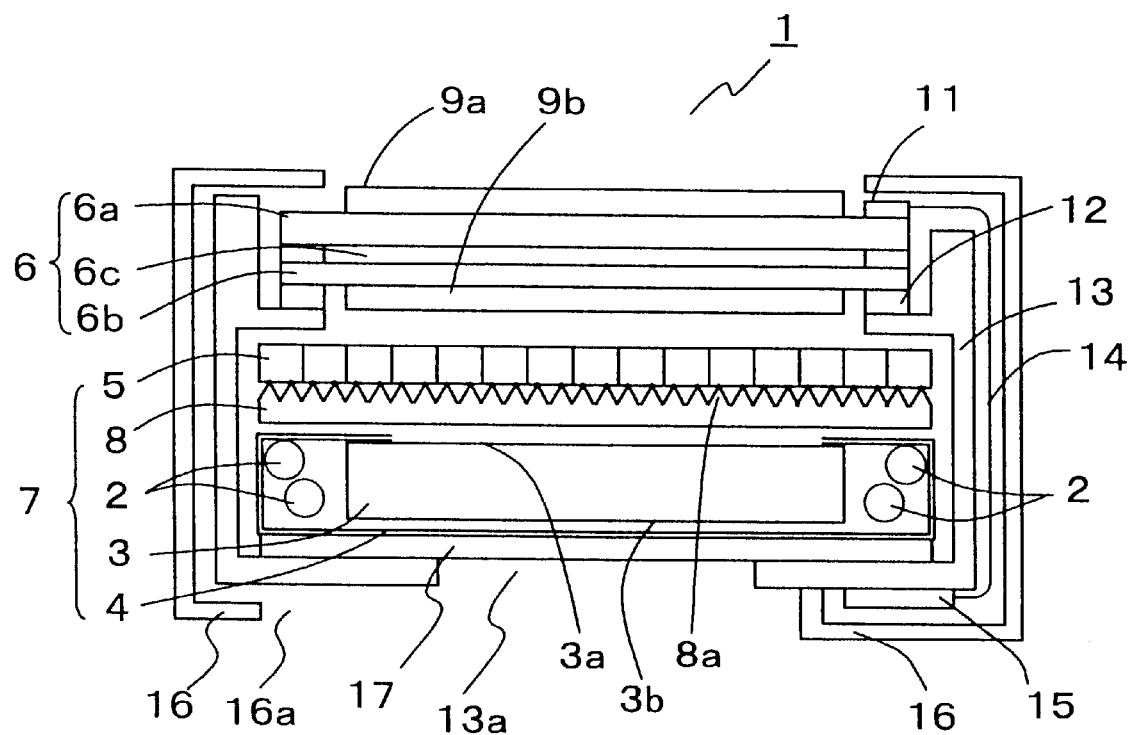
FIG. 1 is a diagram showing the structure of the liquid crystal display device of a first embodiment of the invention.
Figure 26:
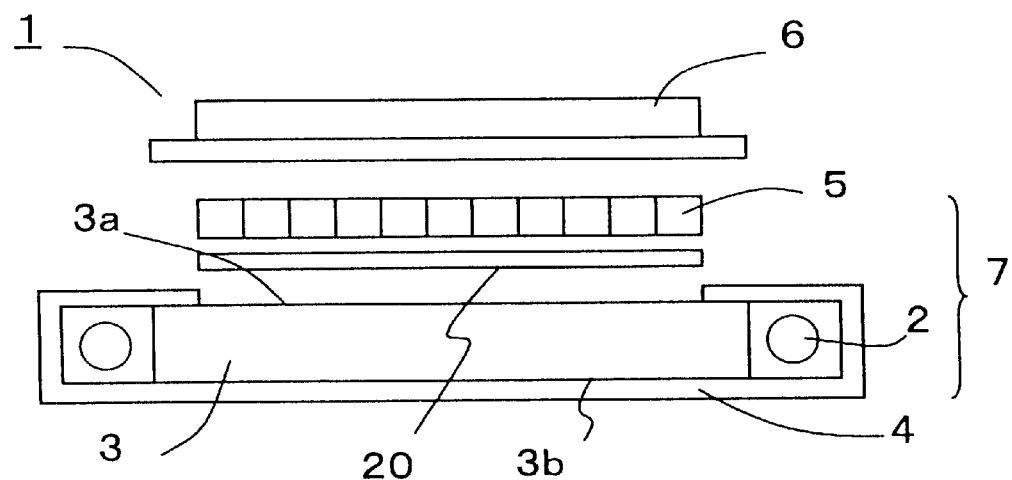
FIG. 26 is a diagram showing the structure of a conventional liquid crystal display device.

Hereinafter, embodiments of the present invention will be described with reference to the drawings. For convenience' sake, in the following descriptions, such members as are found also in the conventional example shown in FIG. 26 are identified with the same reference numerals. FIG. 1 is a sectional view showing the liquid crystal display device of a first embodiment of the invention. The liquid crystal display device 1 has a liquid crystal panel 6 and a backlight 7 held together by a metal bezel 16 formed by pressing.

The liquid crystal panel 6 has liquid crystal 6c sealed between transparent base plates 6a and 6b that are made of glass or the like and are arranged so as to face each other, and has a large number of pixels arranged in a matrix. On both sides of the liquid crystal panel 6 are disposed polarizer plates 9a and 9b for making the polarization plane of the light incident on and emerging from the liquid crystal panel 6 uniform.

The backlight 7 is housed in a chassis 13 made of molded plastic, and the chassis 13 is firmly fitted to the liquid crystal panel 6 with double-faced adhesive tape 12. Inside the chassis 13, a light guide plate 3 covered with a reflector sheet 4 is disposed. Along opposite sides of the light guide plate 3, light sources 2 are supported by a supporting member (not shown). The light guide plate 3 is composed of a base member made of acrylic resin or the like, and particles of a medium, having a different refractive index from the base member, contained in the base member. The reflector sheet 4 is formed out of a 188 μm thick sheet of polyethylene terephthalate (PET). Instead, the reflector sheet 4 may be formed out of a reflective film of silver or the like, or a reflective sheet exploiting reflection by polarization.

Thus, the light from the light sources 2 that is incident on the light guide plate 3 is refracted by the particulate medium so as to travel toward the exit surface 3a, and the light traveling at angles greater than the critical angle emerges, as scattered light, from the light guide plate 3 through the exit surface 3a. The emerging light may be scattered by forming the exit surface 3a of the light guide plate 3 as a non-glossy surface by sandblasting or the like. On the back surface of the reflector sheet 4, a heat radiator plate 17 is provided. In the chassis 13 and the bezel 16, air vents 13a and 16a are formed to help heat dissipate from the heat radiator plate 17.

Above the light guide plate 3 is disposed a prism sheet 8 having a plurality of prisms 8a arranged at predetermined intervals. As the prism sheet 8 is used one of those commercially available with prisms 8a having a vertical angle of 60°, 65°, or 90°, for example, or having curved surfaces at the vertices. The prisms 8a are arranged in an orientation inclined 3° or more relative to the orientation in which the pixels of the liquid crystal panel 6 are arranged in order to prevent moiré fringes.

Figure 27:
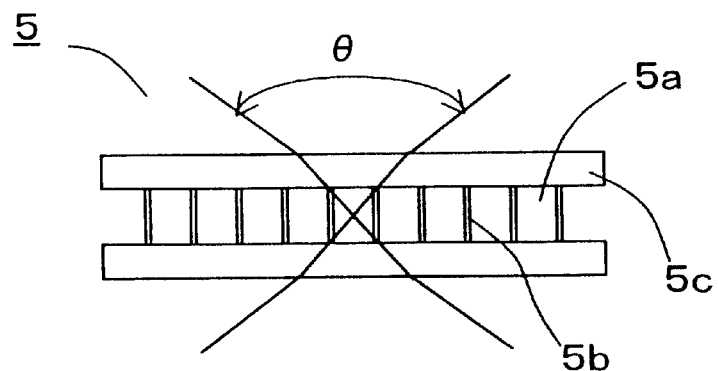
FIG. 27 is a diagram showing the structure of a conventional light shield louver.
Figure 28:
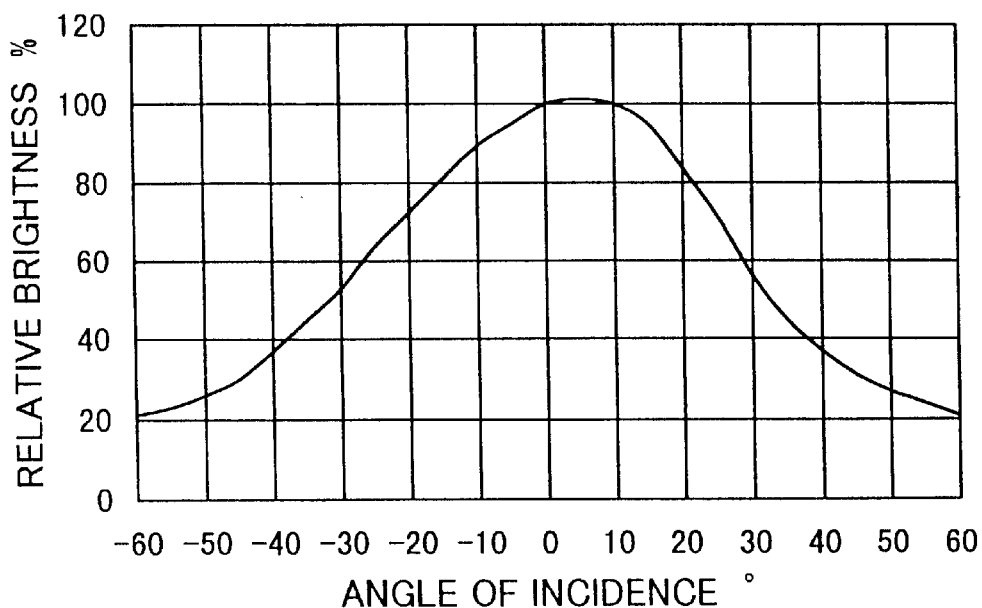
FIG. 28 is a diagram showing the brightness distribution of the light incident on the light shield louver in a conventional liquid crystal display device.
Figure 29:
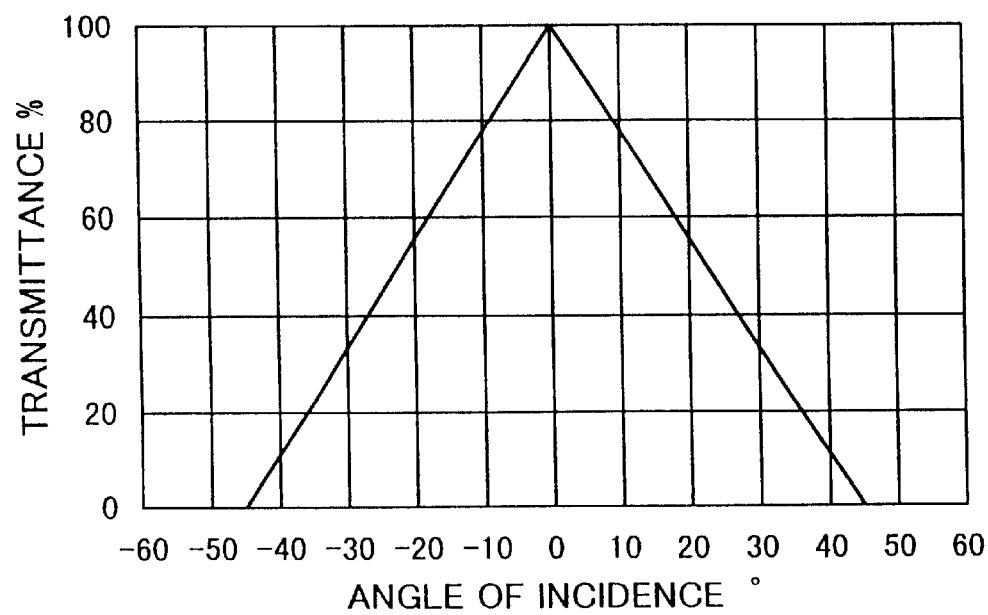
FIG. 29 is a diagram showing the transmittance of the light shield louver of a conventional liquid crystal display device.

Above the prism sheet 8 is disposed a light shield louver 5 for shielding the light incident thereon within a predetermined range of angles. As shown in FIG. 27 described earlier, the light shield louver 5 has light-transmitting layers 5a, which transmit light, and light-absorbing layers 5b, which absorb light, arranged, for example, at 50 μm intervals and sandwiched between transparent base plates 5c. Thus, of the light incident on the light shield louver 5, the portion traveling within a range θ of viewing angles is transmitted, but the portion traveling outside the range θ of viewing angles is shielded.

The light shield louver 5 has its layers 5a and 5b arranged, in a similar manner as described above, in an orientation 3° or more inclined relative to the orientation in which the pixels of the liquid crystal panel 6 are arranged in order to prevent moiré fringes. The orientation in which the prism sheet 8 has its prisms 8a arranged and the orientation in which the light shield louver 5 has its layers 5a and 5b arranged relative to the orientation in which the pixels of the liquid crystal panel 6 are arranged may be inclined in opposite directions or at different angles in the same direction.

The light traveling within the range θ of viewing angles (see FIG. 27) and transmitted through the light shield louver 5 illuminates the liquid crystal panel 6, and is transmitted through particular pixels thereof so as to form an image. As a result, this transmissive liquid crystal display device 1 permits the image to be viewed from a viewpoint within a predetermined range of directions. Reference numeral 15 represents a circuit board of the liquid crystal display device 1, reference numeral 11 represents a driver for driving the liquid crystal panel 6, and reference numeral 14 represents a printed circuit board for connecting the circuit board 15 and the driver 11 together.

Figure 2:
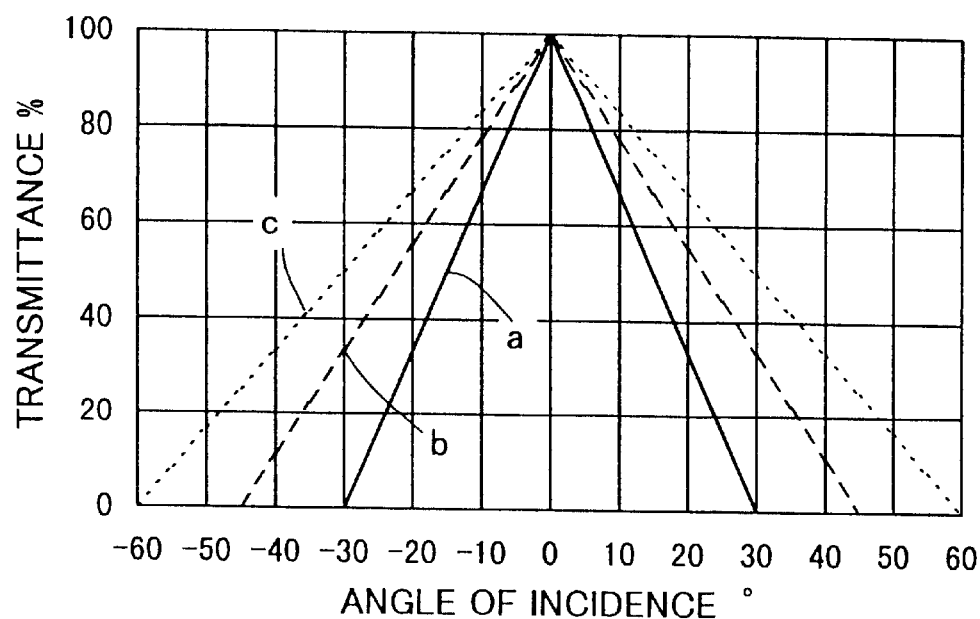
FIG. 2 is a diagram showing the transmittance of the light shield louver of the liquid crystal display device of the first embodiment.

FIG. 2 shows the relationship of the transmittance of the light shield louver 5 to the angle of incidence of the light incident thereon. In this figure, the transmittance (%) is taken along the vertical axis, and the angle of incidence (°) is taken along the horizontal axis. In the figure, (a), (b), and (c) indicate the transmittance of the light shield louver 5 when the range θ of viewing angles it offers is ±30°, ±45°, and ±90°, respectively. The transmittance of the light shield louver 5 is highest at an angle of incidence of 0°, and decreases linearly as the absolute value of the angle of incidence increases.

Figure 3:
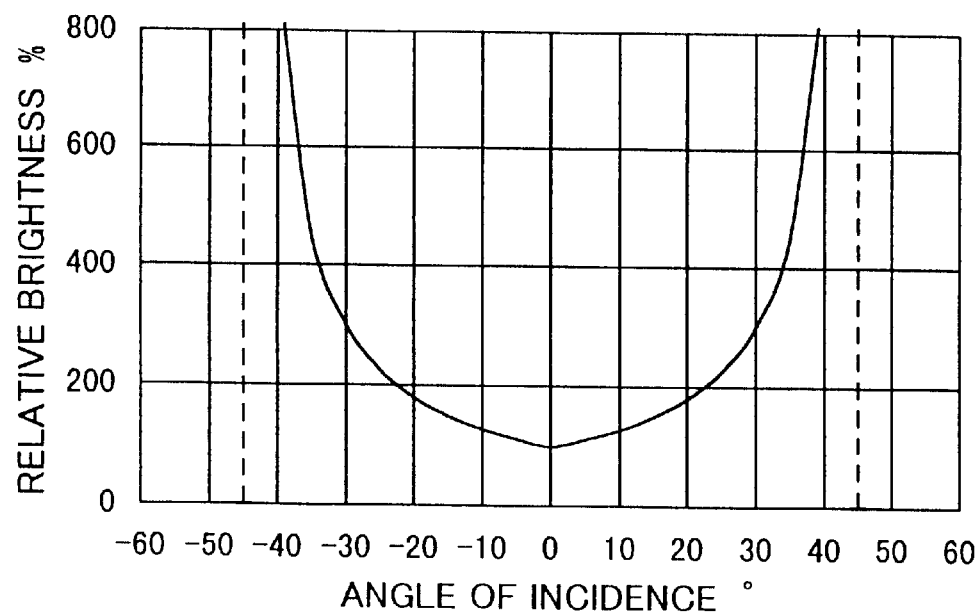
FIG. 3 is a diagram showing an ideal brightness distribution of the light incident on the light shield louver in the liquid crystal display device of the first embodiment.
Figure 4:
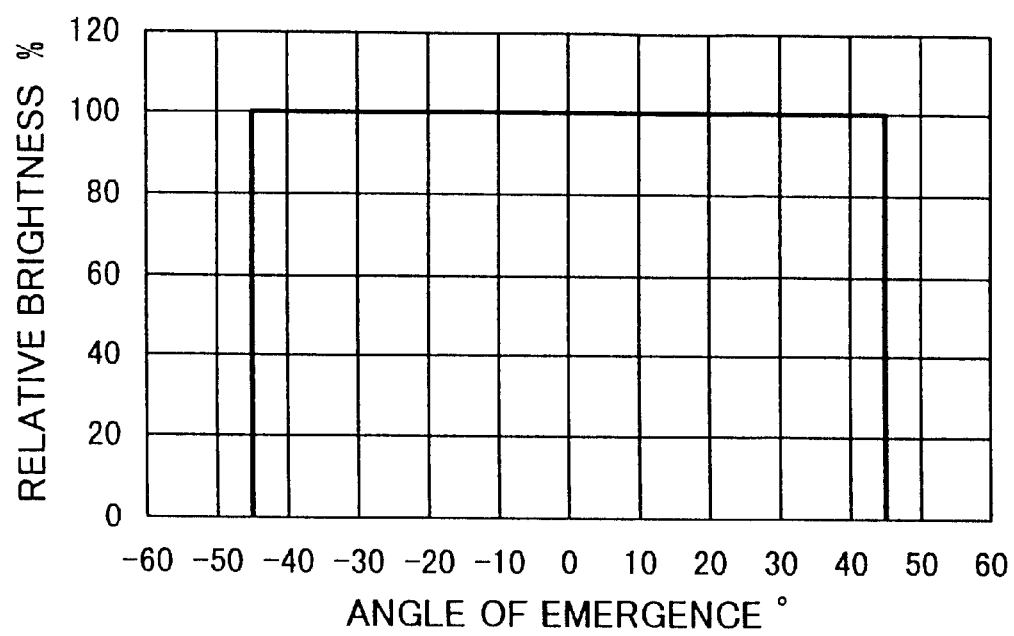
FIG. 4 is a diagram showing an ideal brightness distribution of the light emerging from the light shield louver in the liquid crystal display device of the first embodiment.

For example, when a light shield louver 5 having characteristics as indicated by (b) in FIG. 2 is illuminated with light having a brightness distribution such that, as shown in FIG. 3, brightness is proportional to the reciprocal of the transmittance indicated by (b) in FIG. 2 (i.e. the brightness of the light is at a minimum at an angle of incidence of 0°), then the emerging light exhibits a brightness distribution such that brightness rises at ±45° as shown in FIG. 4.

Thus, within the range θ of viewing angles, the viewer can view an image with uniform brightness irrespective of his or her viewpoint. In FIG. 3 the angle of incidence (°) is taken along the horizontal axis, the relative brightness (%) of the incident light is taken along the vertical axis, and the broken lines represent asymptotes. In FIG. 4, the angle of emergence (°) with respect to the light shield louver 5 is taken along the horizontal axis, and the relative brightness (%) of the emerging light relative to its brightness at an angle of emergence of 0° is taken along the vertical axis.

Figure 5:
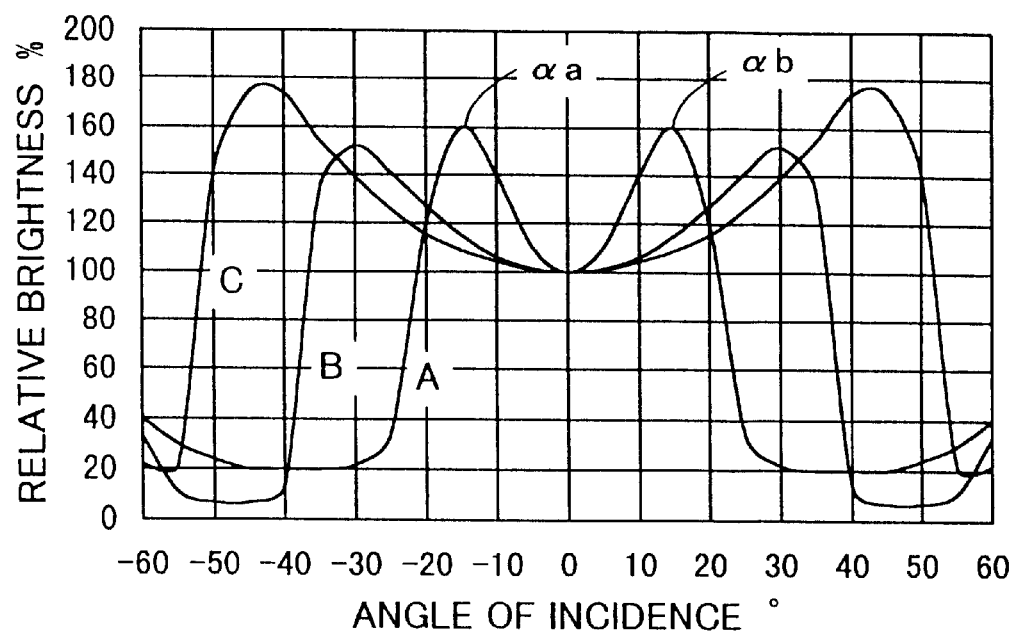
FIG. 5 is a diagram showing the brightness distribution of the light incident on the light shield louver in the liquid crystal display device of the first embodiment.

By properly selecting the shape of the prisms 8a of the prism sheet 8, it is possible to approximate the brightness distribution of the light incident on the light shield louver 5 to the brightness distribution shown in FIG. 3. FIG. 5 shows the brightness distribution of the light incident on the light shield louver 5 with varying vertical angles of the prisms 8a. In this figure, the angle of incidence (°) of the light incident on the light shield louver 5 is taken along the horizontal axis, and the relative brightness (%) is taken along the vertical axis.

In any of the brightness distributions (A), (B), and (C), brightness is at a minimum around an angle of incidence of 0°. In the brightness distribution (A), the angular difference between the angle of incidence αa at which brightness is highest within the range of angles of incidence from 0° to −90° and the angle of incidence αb at which brightness is highest within the range of angles of incidence from 0° to +90° (hereinafter, this angular difference will be referred to as the "peak interval") is about 30°. In the brightness distributions (B) and (C), the peak interval is about 60° and about 90°, respectively.

Figure 6:
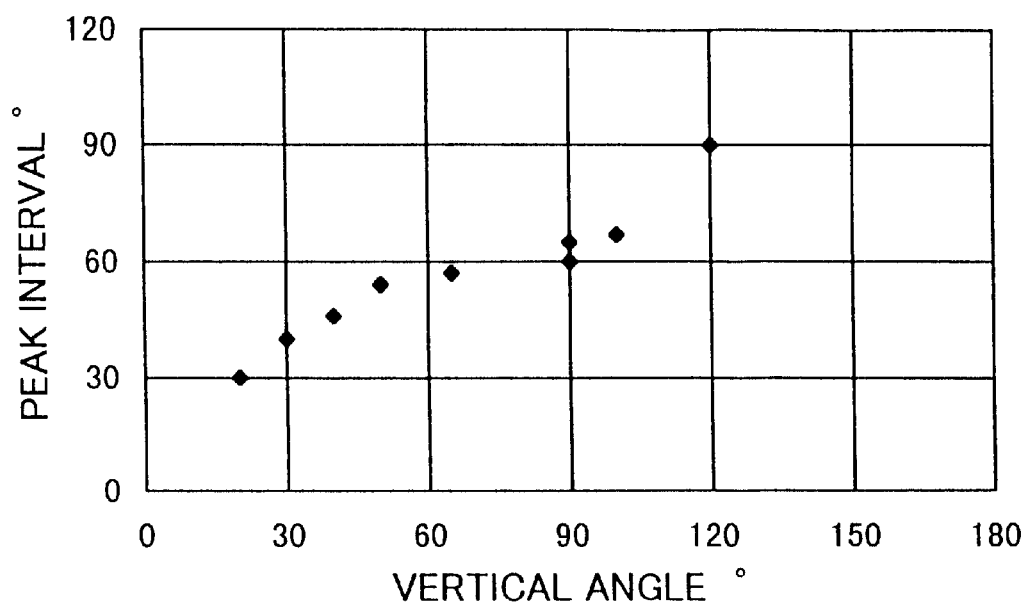
FIG. 6 is a diagram showing the relationship between the vertical angle and the peak interval of the prisms in the liquid crystal display device of the first embodiment.

As shown in FIG. 6, the peak interval varies according to the vertical angle of the prisms 8a. In this figure, the peak interval (°) is taken along the vertical axis, and the vertical angle (°) of the prisms 8a is taken along the horizontal axis. The prisms 8a that exhibit the brightness distributions (A), (B), and (C) have vertical angles of 20°, 90°, and 120°, respectively, are arranged at 50 μm intervals, and have their vertices formed into points having a radius of 10 μm or smaller. The vertices of the prisms 8a may be formed into curved surfaces or the like.

Figure 7:
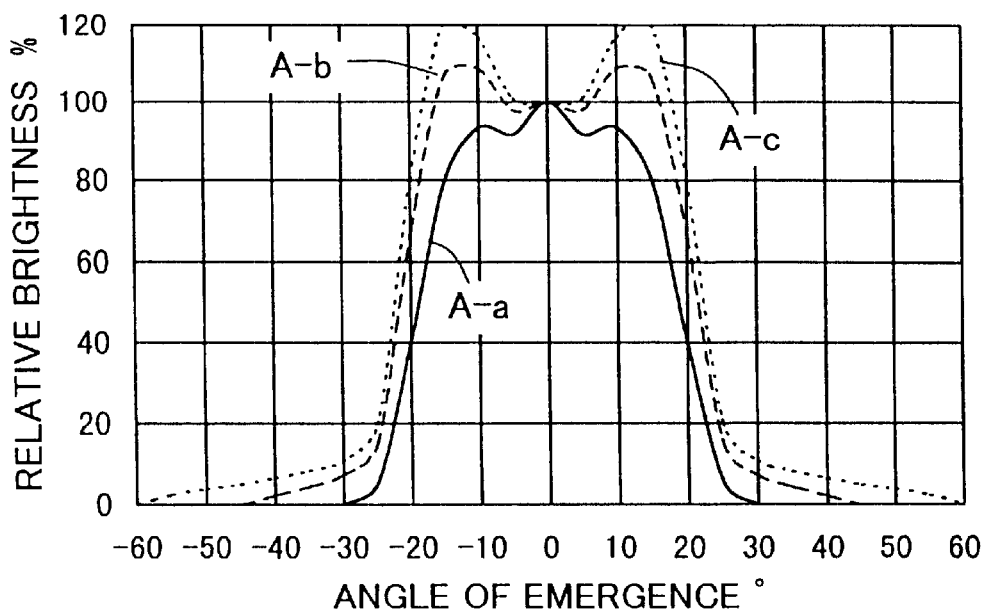
FIG. 7 is a diagram showing the brightness distribution of the light emerging from the light shield louver when the vertical angle of the prisms is 45° in the liquid crystal display device of the first embodiment.
Figure 8:
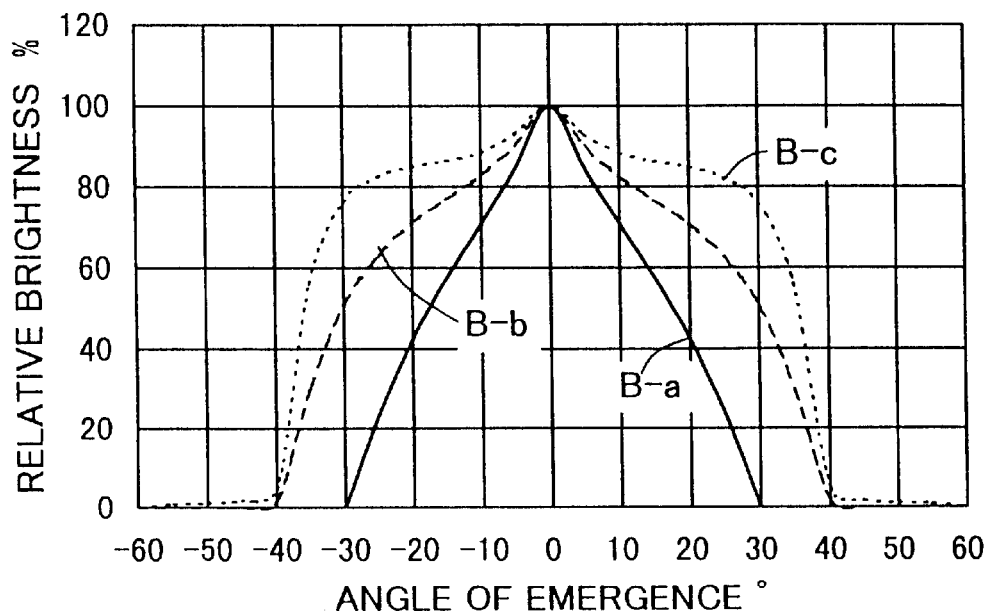
FIG. 8 is a diagram showing the brightness distribution of the light emerging from the light shield louver when the vertical angle of the prisms is 90° in the liquid crystal display device of the first embodiment.
Figure 9:
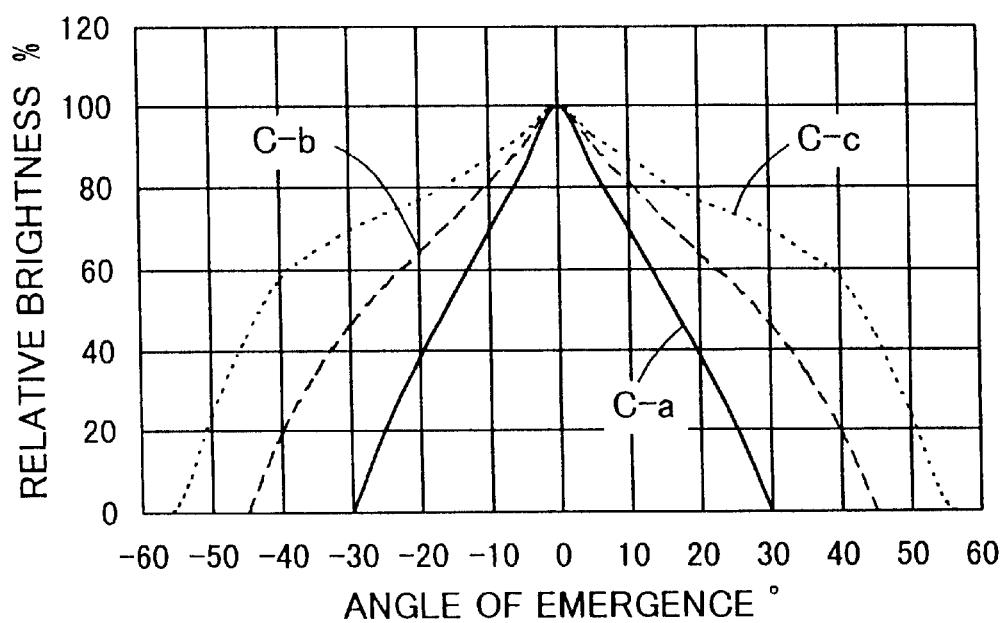
FIG. 9 is a diagram showing the brightness distribution of the light emerging from the light shield louver when the vertical angle of the prisms is 120° in the liquid crystal display device of the first embodiment.

FIGS. 7 to 9 show the brightness distribution of the light emerging from the light shield louver 5 when it exhibits transmittance as indicated by (a), (b), and (c) in FIG. 2 described earlier and is illuminated with light having a brightness distribution as indicated by (A), (B), and (C) in FIG. 5, respectively. In these figures, the angle of emergence (°) is taken along the horizontal axis, and the relative brightness (%) relative to the brightness at an angle of incidence of 0° is taken along the vertical axis.

In FIG. 7, (A-a) indicates the brightness distribution of the emerging light when the peak interval is 30° and the range θ of viewing angles is 60° (±30°). When the absolute value of the angle of emergence exceeds 30°, the relative brightness drops to 0%, and, within a range of angles of emergence of about ±15°, the relative brightness is in a range from 80% to 100%.

Figure 10:
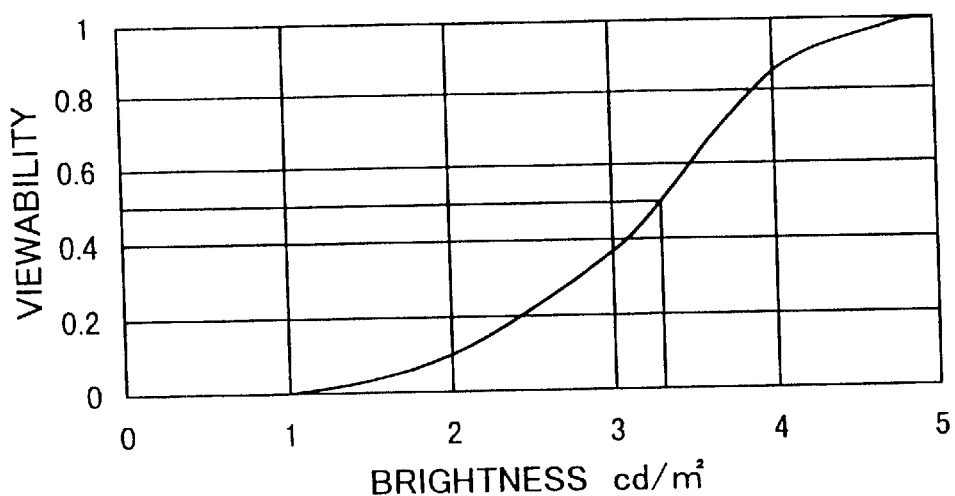
FIG. 10 is a diagram showing the relationship between the viewability of an image projected onto the windshield of a car by a car-mounted liquid crystal display device and the brightness of the image.

With a liquid crystal display device designed for car-mounted use, if an image displayed thereon is projected onto the windshield of the car, it may lead to a car accident during driving. FIG. 10 is a diagram showing the viewability of an image projected onto the windshield. In this figure, the brightness (cd/m$^2$) of the image projected onto the windshield is taken along the horizontal axis, and its viewability is taken along the vertical axis.

The viewability is calculated as an average of values obtained from a plurality of viewers who report "1" when they find the image easily recognizable, "0.5" when they find it recognizable with extra effort, and "0" when they find it unrecognizable. If it is assumed that viewability of 0.5 or lower has little effect on driving, the brightness of such an image needs to be 3.3 cd/m$^2$ or lower. Generally, the brightness of an image displayed on the liquid crystal display device 1 at night is 30 cd/m$^2$, and therefore it is advisable that the relative brightness of the image projected toward the windshield be reduced to, if a margin is allowed, 10% or less of that brightness.

Accordingly, let α represent the absolute value of the angle of emergence at which the relative brightness is 10% so that ±α represents the effective range of viewing angles, then, in the case indicated by (A-a), α≈24°. With a narrow effective range of viewing angles, the liquid crystal display device 1 exhibits high directionality in terms of the viewable range. Thus, when installed inside a car, the liquid crystal display device 1 permits a wide choice of installation positions while ensuring low brightness of the image projected onto the windshield; when used in an ATM or the like, the liquid crystal display device 1 is highly effective in blocking stealthy viewing. However, the liquid crystal display device 1 then requires the viewer to view it from a viewpoint within the narrow range of viewing angles.

By contrast, with a wide effective range of viewing angles, the liquid crystal display device 1 exhibits low directionality, and thus permits the viewer to view it from a viewpoint within the wide range of viewing angles. However, the liquid crystal display device 1 then permits a narrow choice of installation positions inside a car, and is ineffective in blocking stealthy viewing in an ATM or the like. For these reasons, the liquid crystal display device 1 needs to be designed to offer an appropriate range of viewing angles that suits its actual applications.

In actual use of the liquid crystal display device 1, the viewpoint of the viewer is considered to remain mostly in the central half of the effective range of viewing angles, i.e. within the range of ±α/2. Here, assuming that the relative brightness decreases linearly in relation to the angle of emergence, the relative brightness is 55% at angles of emergence of ±α/2. Thus, if the relative brightness at angles of emergence of ±α/2 is 55% or more, brightness varies more gradually as the viewpoint varies than in conventional configurations. This helps enhance viewability in the frequently used range.

In the case indicated by (A-a), the relative brightness when the absolute value of the angle of emergence is α/2=12° is about 90%. This makes it possible to realize a liquid crystal display device 1 that exhibits high directionality in terms of the viewable range with respect to the angle of emergence and that ensures reduced variation in brightness in that range.

The black lines (stripes) caused by errors in the intervals at which the light-transmitting and light-absorbing layers 5a and 5b of the light shield louver 5 are arranged become less conspicuous with increasing brightness. Thus, while a viewer is viewing a liquid crystal display device 1 having characteristics as indicated by (A-a), by shifting the line of sight of the viewer obliquely from the direction normal to the liquid crystal panel 6 (i.e. the direction corresponding to an angle of emergence of 0°), it is possible to make the black lines less conspicuous over a wide range, because brightness is high over a wide range.

In FIG. 7, (A-b) indicates the brightness distribution of the emerging light when the peak interval is 30° and the range θ of viewing angles is 90° (±45°). When the absolute value of the angle of emergence exceeds 30°, the relative brightness drops to 10% or less, and, within a range of angles of emergence of about ±15°, the relative brightness is in a range from 100% to 110%. The effective range of viewing angles is determined by α≈28°, and the relative brightness when the absolute value of the angle of emergence is α/2 is about 105%. This makes it possible to realize a liquid crystal display device 1 that exhibits high directionality in terms of the viewable range with respect to the angle of emergence and that ensures reduced variation in brightness in that range. Moreover, it is possible to make less conspicuous, in a wide range, the black lines caused by errors in the intervals at which the light-transmitting and light-absorbing layers 5a and 5b of the light shield louver 5 are arranged.

In FIG. 7, (A-c) indicates the brightness distribution of the emerging light when the peak interval is 30° and the range θ of viewing angles is 120° (±60°). When the absolute value of the angle of emergence exceeds 30°, the relative brightness drops to 10% or less, and, within a range of angles of emergence of about ±15°, the relative brightness is in a range from 100% to 120%. The effective range of viewing angles is determined by α≈30°, and the relative brightness when the absolute value of the angle of emergence is α/2 is about 120%. This makes it possible to realize a liquid crystal display device 1 that exhibits high directionality in terms of the viewable range with respect to the angle of emergence and that ensures reduced variation in brightness in that range. Moreover, it is possible to make less conspicuous, in a wide range, the black lines caused by errors in the intervals at which the light-transmitting and light-absorbing layers 5a and 5b of the light shield louver 5 are arranged.

Figure 30:
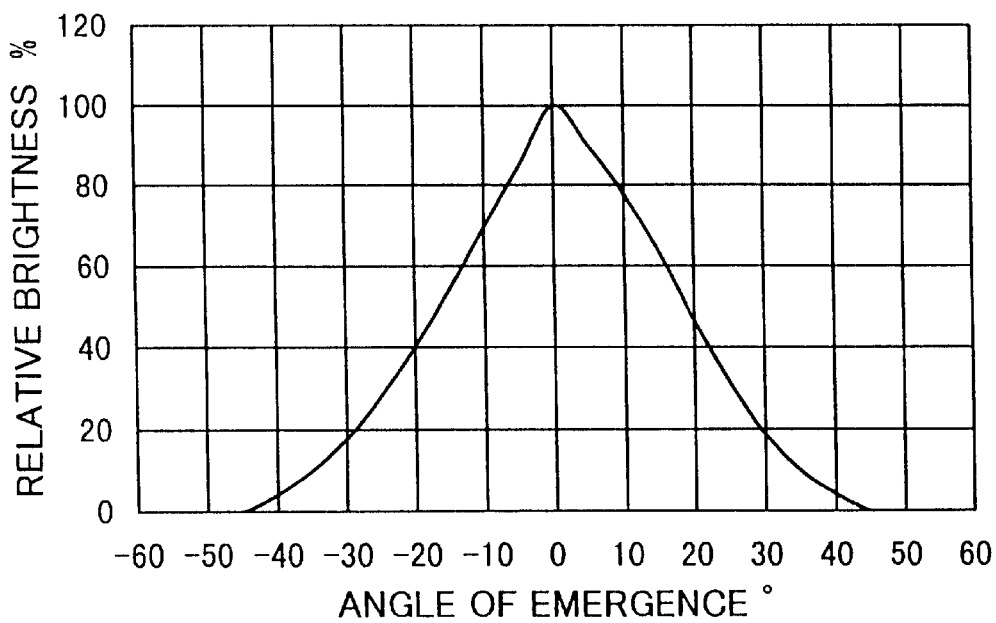
FIG. 30 is a diagram showing the brightness distribution of the light emerging from the light shield louver in a conventional liquid crystal display device.
Figure 31:
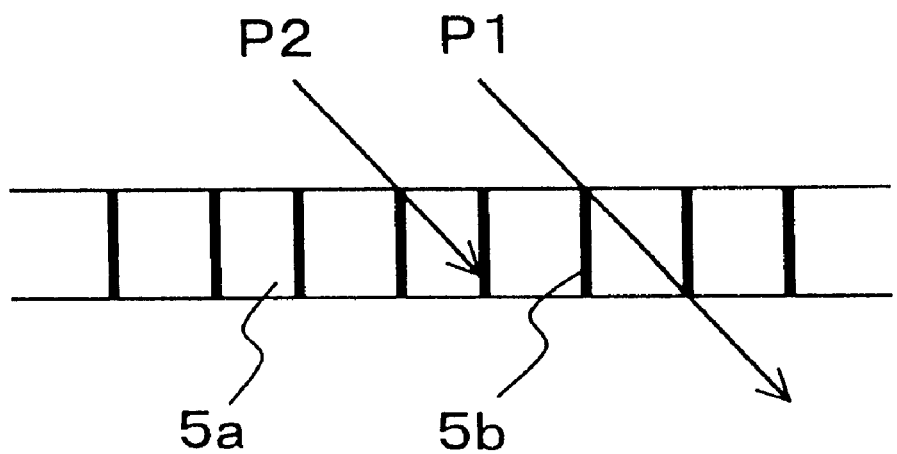
FIG. 31 is a diagram illustrating the problems inevitable with the light shield louver of a conventional liquid crystal display device.

In FIG. 8, (B-a) indicates the brightness distribution of the emerging light when the peak interval is 60° and the range θ of viewing angles is 60° (±30°). The relative brightness is highest at an angle of emergence of 0°, and substantially monotonically decreases as the absolute value of the angle of emergence increases until it becomes 0% when the absolute value of the angle of emergence exceeds 30°. Thus, as in the brightness distribution of the emerging light shown in FIG. 30 as observed in a conventional configuration, brightness varies greatly in relation to the angle of emergence. However, the effective range of viewing angles is determined by α≈28°, and the relative brightness when the absolute value of the angle of emergence is α/2 is about 60%. This reduces variation in brightness while the viewer's viewpoint varies within the frequently used range (±α/2), and thus helps achieve better viewability than in conventional configurations.

In FIG. 8, (B-b) indicates the brightness distribution of the emerging light when the peak interval is 60° and the range θ of viewing angles is 90° (±45°). The relative brightness drops to 0% when the absolute value of the angle of emergence exceeds 45°. Within a range of angles of emergence of about ±20°, the relative brightness is in a range from 70% to 100%, and, within a range of angles of emergence of about ±30°, the relative brightness is in a range from 50% to 100%.

The effective range of viewing angles is determined by α≈38°, and the relative brightness when the absolute value of the angle of emergence is α/2 is about 70%. Thus, by making the range θ (=90°) of viewing angles wider than the peak interval (=60°), it is possible to realize a liquid crystal display device 1 that ensures less variation in brightness than in the case indicated by (B-a). Moreover, it is possible to make less conspicuous, over a wide range, the black lines caused by errors in the intervals at which the light-transmitting and light-absorbing layers 5a and 5b of the light shield louver 5 are arranged.

In FIG. 8, (B-c) indicates the brightness distribution of the emerging light when the peak interval is 60° and the range θ of viewing angles is 120° (±60°). The relative brightness drops to 0% when the absolute value of the angle of emergence exceeds 60°. Within a range of angles of emergence of about ±30°, the relative brightness is in a range from 80% to 100%. The effective range of viewing angles is determined by α≈39°, and the relative brightness when the absolute value of the angle of emergence is α/2 is about 85%. Thus, by making greater the difference between the range θ (=120°) of viewing angles and the peak interval (=60°), it is possible to realize a liquid crystal display device 1 that ensures reduced variation in brightness and inconspicuous black lines in a wider range than in the case indicated by (B-b).

When the liquid crystal display device 1 is mounted on a car, it is desirable to install it as high as possible above the dashboard to reduce the movement of the viewer's line of sight during driving and thereby achieve satisfactory viewability. However, when the effective range of viewing angles of the liquid crystal display device 1 is wider than ±40°, if it is installed in a high position, an image carried by the light traveling outside the range of angles of emergence of ±40° may be projected onto the windshield. To avoid this, the liquid crystal display device 1 needs to be installed below the dashboard.

In the case indicated by (B-c), the light shield louver 5 offers a range θ of viewing angles of 120°, and therefore, although high brightness is obtained over a wide range, the relative brightness is as low as 5% or less at angles of emergence of ±40°. This makes it possible to realize a liquid crystal display device 1 that can be installed above the dashboard, that offers satisfactory viewability, and that ensures extremely reduced unwanted projection and extremely reduced variation in brightness.

In FIG. 9, (C-a) indicates the brightness distribution of the emerging light when the peak interval is 90° and the range θ of viewing angles is 60° (±30°). The relative brightness is highest at an angle of emergence of 0°, and monotonically decreases as the absolute value of the angle of emergence increases until it becomes 0% when the absolute value of the angle of emergence exceeds 30°. Thus, just as in the case indicated by (B-a) described earlier, brightness varies greatly in relation to the angle of emergence, but the effective range of viewing angles is determined by α≈26°, and the relative brightness when the absolute value of the angle of emergence is α/2 is about 60%. This reduces variation in brightness while the viewer's viewpoint varies within the frequently used range, and thus helps achieve better viewability than in conventional configurations.

In FIG. 9, (C-b) indicates the brightness distribution of the emerging light when the peak interval is 90° and the range θ of viewing angles is 90° (±45°). The relative brightness drops to 0% when the absolute value of the angle of emergence exceeds 45°. The effective range of viewing angles is determined by α≈44°, and the relative brightness when the absolute value of the angle of emergence is α/2 is about 60%. Thus, as in the case described just above, it is possible to reduce variation in brightness as compared with conventional configurations.

Moreover, as described earlier, when the liquid crystal display device 1 is mounted on a car, it is desirable to design it to offer a range of viewing angles of ±40° so that it can be installed in a high position, requires less movement of the viewer's line of sight, and offers better viewability. Setting the peak interval equal to 90° as in the case indicated by (C-b) may result in a range of viewing angles wider than ±40°, and therefore it is particularly preferable to set the peak interval equal to 80° or smaller.

In FIG. 9, (C-c) indicates the brightness distribution of the emerging light when the peak interval is 90° and the range θ of viewing angles is 120° (±60°). The relative brightness drops to 0% when the absolute value of the angle of emergence exceeds 55°. The effective range of viewing angles is determined by α≈54°, and the relative brightness when the absolute value of the angle of emergence is α/2 is about 70%. Thus, as in the case described just above, it is possible to reduce variation in brightness as compared with conventional configurations, and make the liquid crystal display device 1 usable in applications other than for car-mounted use.

Figure 11:
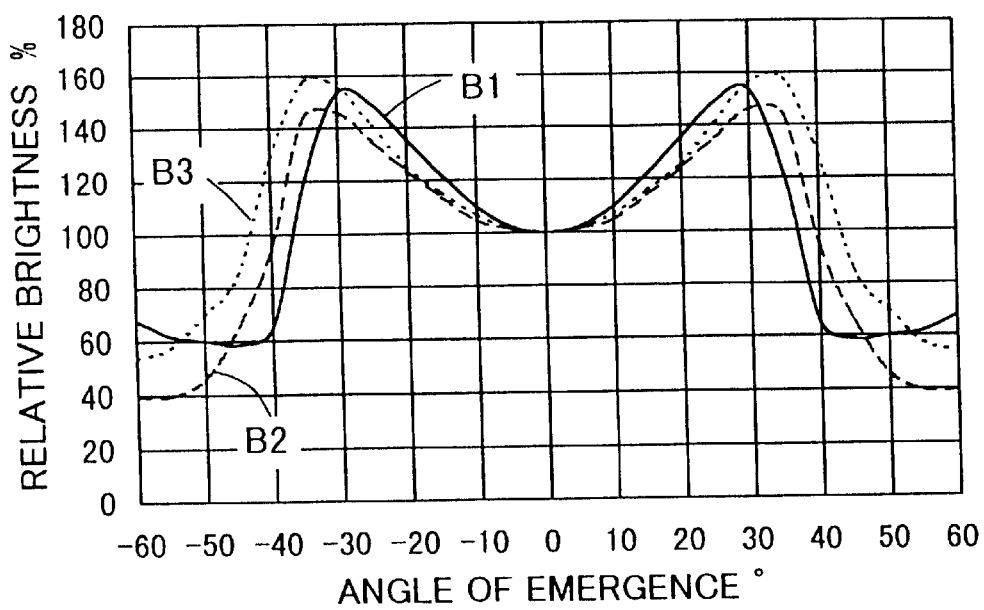
FIG. 11 is a diagram showing the brightness distribution of the light incident on the light shield louver when the prisms have another shape in the liquid crystal display device of the first embodiment.

FIG. 11 shows the brightness distribution of the light incident on the light shield louver 5 when the prisms 8a have another shape. In this figure, the relative brightness (%) is taken along the vertical axis, and the angle of incidence (°) is taken along the horizontal axis. In the figure, (B1) indicates a case in which the prisms 8a have a vertical angle of 65° and are arranged at 50 μm intervals; (B2) indicates a case in which the prisms 8a have a vertical angle of 90°, are arranged at 50 μm intervals, and have their vertices formed into curved surfaces having a radius of 10 μm; (B3) indicates a case in which the prisms 8a are formed into the shape of a sine wave having a period of 50 μm. In these cases, the peak interval is 57°, 65°, and 67°, respectively.

Figure 12:
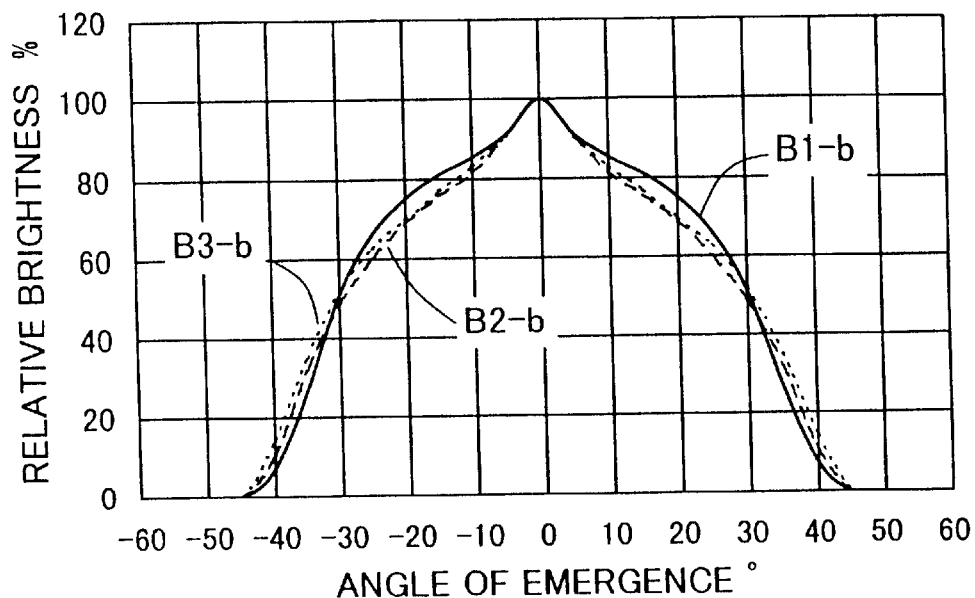
FIG. 12 is a diagram showing the brightness distribution of the light emerging from the light shield louver, when it offers a range of viewing angles of 90°, in the case shown in FIG. 11.

FIG. 12 shows the brightness distribution of the light emerging from the light shield louver 5 when it offers a range θ of viewing angles of 90° (±45°) as indicated by (b) in FIG. 2 and is illuminated with light having a brightness distribution as indicated by (B1), (B2), and (B3). In this figure, (B1-b) indicates the case in which the incident light has a brightness distribution as indicated by (B1), (B2-b) indicates the case in which the incident light has a brightness distribution as indicated by (B2), and (B3-b) indicates the case in which the incident light has a brightness distribution as indicated by (B3).

In any of these cases, the relative brightness drops to 0% when the absolute value of the angle of emergence exceeds 45°. Within a range of angles of emergence of about ±25°, the relative brightness is 60% or more. The effective range of viewing angles is determined by α≈40°, and the relative brightness when the absolute value of the angle of emergence is α/2 is about 70%. Thus, it is possible to realize a liquid crystal display device 1 that ensures reduced variation in brightness and inconspicuous black lines in a wide range.

Figure 13:
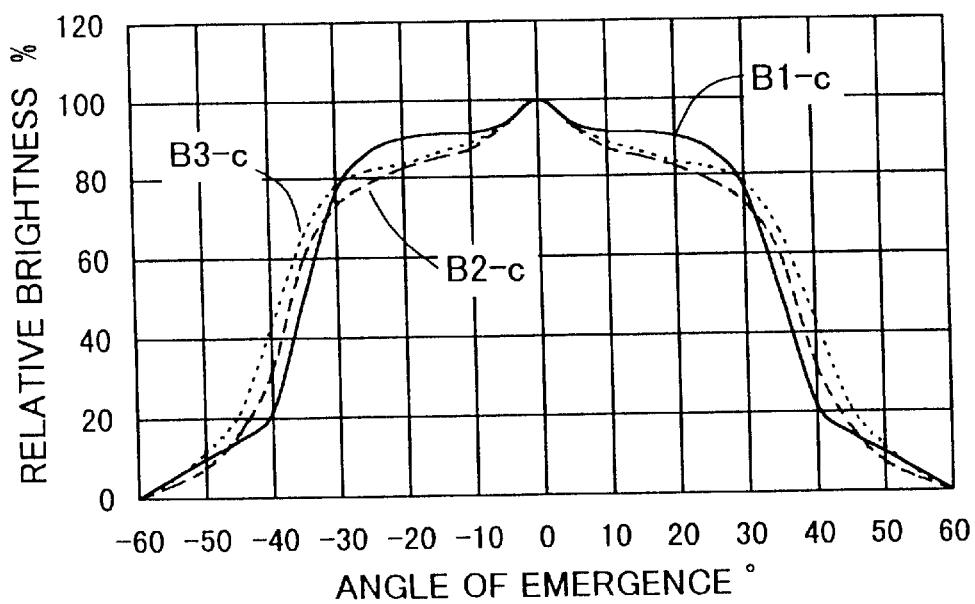
FIG. 13 is a diagram showing the brightness distribution of the light emerging from the light shield louver, when it offers a range of viewing angles of 120°, in the case shown in FIG. 11.

FIG. 13 shows the brightness distribution of the light emerging from the light shield louver 5 when it offers a range θ of viewing angles of 120° (±60°) as indicated by (c) in FIG. 2 and is illuminated with light having a brightness distribution as indicated by (B1), (B2), and (B3). In this figure, (B1-c) indicates the case in which the incident light has a brightness distribution as indicated by (B1), (B2-c) indicates the case in which the incident light has a brightness distribution as indicated by (B2), and (B3-c) indicates the case in which the incident light has a brightness distribution as indicated by (B3).

In any of these cases, the relative brightness drops to 0% when the absolute value of the angle of emergence exceeds 60°. Within a range of angles of emergence of about ±30°, the relative brightness is in a range from 80% to 100%. The effective range of viewing angles is determined by α≈55°, and the relative brightness when the absolute value of the angle of emergence is α/2 is about 80%. Thus, it is possible to realize a liquid crystal display device 1 that ensures reduced variation in brightness.

However, with an effective range of viewing angles wider than ±40°, this liquid crystal display device 1 is not suitable for car-mounted use. Designing the light shield louver 5 to offer a range θ of viewing angles of 120° or wider results in making the effective range of viewing angles wider than ±40°, and therefore it is particularly preferable that the range θ of viewing angles be 110° or narrower. However, if the range θ of viewing angles is narrower than 30°, the peaks (αa and αb in FIG. 5) in the brightness distribution come too close to each other, and this makes it impossible to obtain minimum brightness at an angle of incidence of 0°. Accordingly, it is preferable that the range θ of viewing angles be 30° or wider.

In the cases indicated by (B2-c) and (B3-c), as compared with the case indicated by (B-c) in FIG. 8 described earlier, although the peak interval is substantially equal within the same range θ of viewing angles (120°), the effective range of viewing angles is wider than ±40°, and this makes the liquid crystal display device 1 unsuitable for car-mounted use. This is because, whereas in the case indicated by (B-c) the prisms 8a have their vertices formed into points having a radius of 10 μm or smaller and therefore the light incident on the prisms 8a emerges therefrom in an uniform direction, in the cases indicated by (B2-c) and (B3-c) the prisms 8a have their vertices formed into curved surfaces and therefore the light incident thereon emerges therefrom in scattered directions. Accordingly, it is preferable that the prisms 8a have their vertices formed into points having a radius of 10 μm or smaller.

Figure 14:
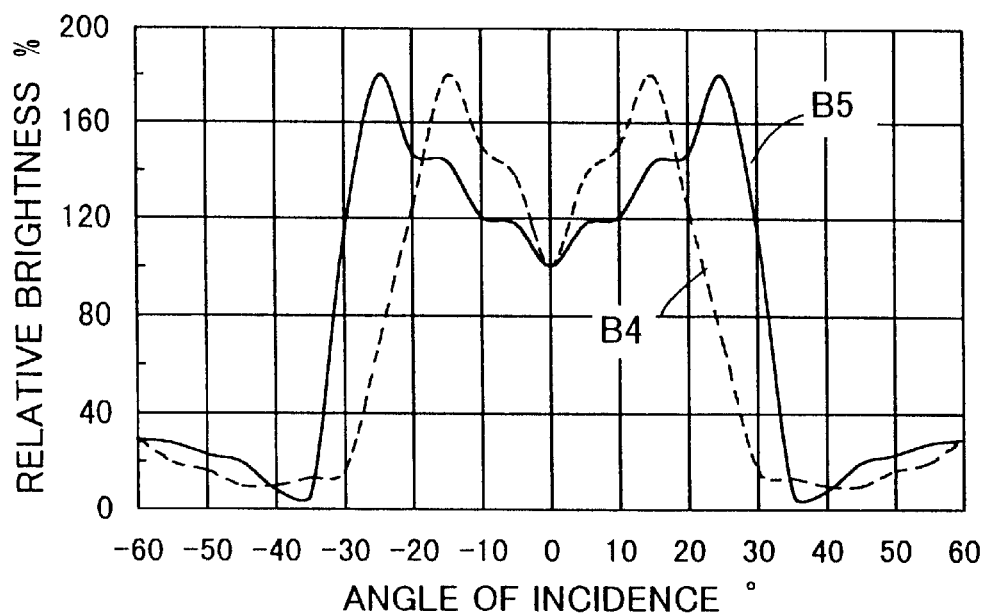
FIG. 14 is a diagram showing the brightness distribution of the light incident on the light shield louver when the prisms have still another shape in the liquid crystal display device of the first embodiment.

FIG. 14 shows the brightness distribution of the light incident on the light shield louver 5 when the prisms 8a have still another shape. In this figure, (B4) and (B5) indicate cases in which brightness has more than one maximum, with the peak interval of 30° and 50°, respectively.

Figure 15:
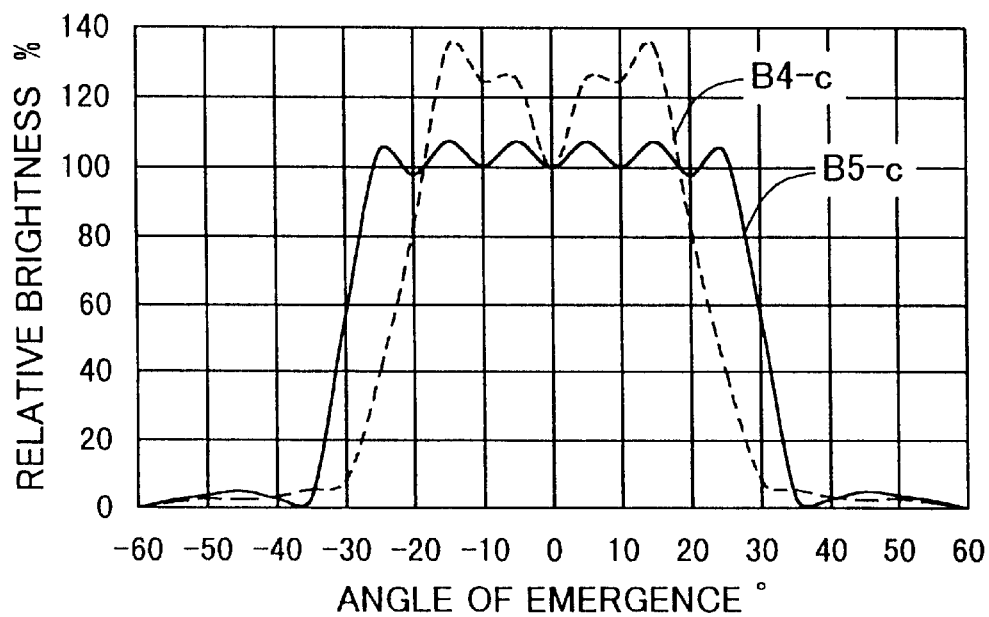
FIG. 15 is a diagram showing the brightness distribution of the light emerging from the light shield louver, when it offers a range of viewing angles of 120°, in the case shown in FIG. 14.

FIG. 15 shows the brightness distribution of the light emerging from the light shield louver 5 when it offers a range θ of viewing angles of 120° (±60°) and is illuminated with light having a brightness distribution as indicated by (B4) and (B5). In this figure, (B4-c) indicates the case in which the incident light has a brightness distribution as indicated by (B4), and (B5-c) indicates the case in which the incident light has a brightness distribution as indicated by (B5).

In either of these cases, the relative brightness drops to 0% when the absolute value of the angle of emergence exceeds 60°. In a range of angles of emergence of about ±20° and ±25°, respectively, the relative brightness is 80% or more. In the case indicated by (B4-c), the effective range of viewing angles is determined by α≈30°, and the relative brightness when the absolute value of the angle of emergence is α/2 is about 130%. In the case indicated by (B5-c), the effective range of viewing angles is determined by α≈34°, and the relative brightness when the absolute value of the angle of emergence is α/2 is 100% or more. Thus, it is possible to realize a liquid crystal display device 1 that ensures extremely reduced variation in brightness within the frequently used range and inconspicuous black lines in a wide range.

Figure 16:
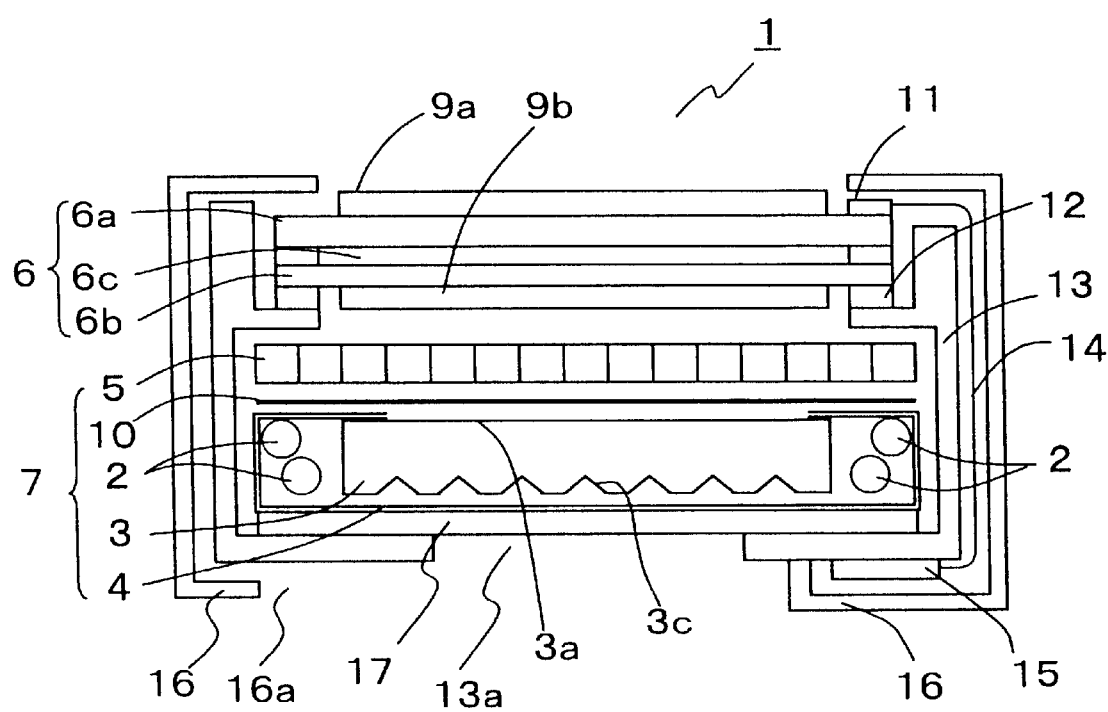
FIG. 16 is a diagram showing the structure of the liquid crystal display device of a second embodiment of the invention.

FIG. 16 is a front view showing the liquid crystal display device of a second embodiment of the invention. For convenience' sake, such members as are found also in the first embodiment shown in FIG. 1 described earlier are identified with the same reference numerals. The light guide plate 3 has prism-shaped concave pits 3c formed in the back surface thereof. The pits 3c are so formed as to have an obtuse angle at their vertices. The light from the light sources 2 is incident on the light guide plate 3 substantially parallel to the exit surface 3a thereof. The light is then reflected from the slant surfaces of the pits 3c so as to emerge from the light guide plate while traveling in slant directions relative to the direction perpendicular to the exit surface 3a.

Thus, the light emerging from the light guide plate 3 exhibits high brightness within a predetermined range of angles that are slant relative to the direction normal to the light guide plate 3. Here, the light emerging from the light guide plate 3 has been reflected from the slant surfaces of the pits 3c, and therefore this light emerges at the same intervals at which the pits 3c are arranged. As a result, even in the same direction of emergence, the emerging light exhibits uneven brightness in phase with the intervals at which the pits 3c are arranged. To overcome this, a diffuser sheet 10 is provided between the light guide plate 3 and the light shield louver 5.

The diffuser sheet 10 is made of a resin having a haze value of 40%, and serves to diffuse the light emerging from the light guide plate 3 so that uniform light is incident on the light shield louver 5. In this way, it is possible to direct light having a brightness distribution as shown in FIG. 5 described earlier to the light shield louver 5. Here, the haze value H is calculated as follows. Suppose that light is incident on the diffuser sheet 10, and that the portion of the light that is transmitted through the diffuser sheet 10 in the same direction as it is incident thereon has brightness H1 and the portion of the light that is diffused by the diffuser sheet 10 has brightness H2. Then, the haze value H is given by H=H2/(H1+H2).

In this embodiment also, as in the first embodiment, by properly selecting the shape of the pits 3c, it is possible to give the light incident on the light shield louver 5 a brightness distribution such that brightness is at a minimum around an angle of incidence of 0°. In this way, it is possible to limit the light emerging from the light shield louver 5 within a predetermined effective range of viewing angles. This makes it possible to realize a liquid crystal display device 1 that ensures reduced variation in the brightness of the light emerging therefrom and that thus offers satisfactory viewability.

Figure 17:
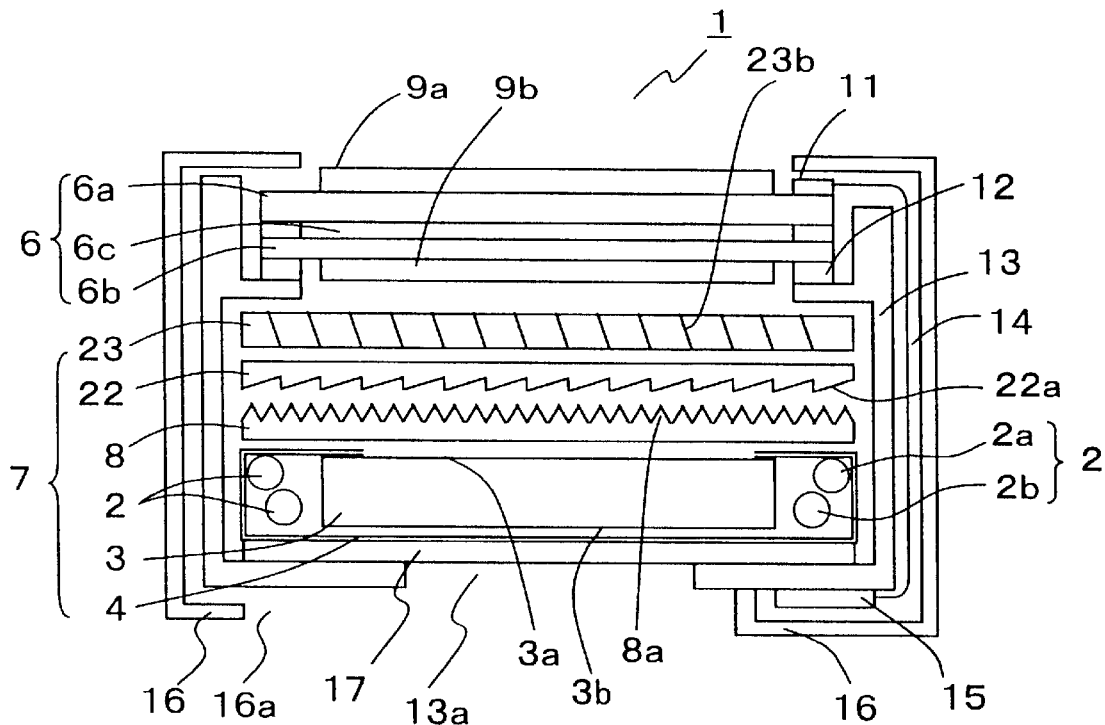
FIG. 17 is a diagram showing the structure of the liquid crystal display device of a third embodiment of the invention.

FIG. 17 is a front view showing the liquid crystal display device of a third embodiment of the invention. For convenience' sake, such members as are found also in the first and second embodiments shown in FIGS. 1 and 16 described earlier are identified with the same reference numerals. This embodiment differs from the first embodiment only in that a Fresnel sheet 22 is disposed between the light shield louver 23 and the prism sheet 8, and that the light shield louver 23 has its light-absorbing layers 23b arranged with an inclination.

Figure 18:
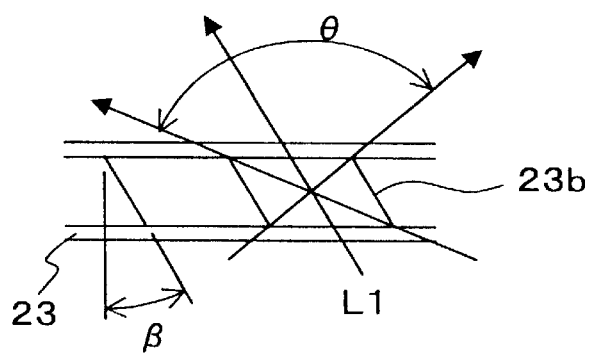
FIG. 18 is a sectional view showing the details of the light shield louver of the liquid crystal display device of the third embodiment.

FIG. 18 is a sectional view showing the details of the light shield louver 23. The light shield louver 23 has its light-absorbing layers 23b so formed as to be inclined by an angle of β relative to the direction normal to the light shield louver 23. Thus, the light shield louver 23 exhibits highest transmittance to the light L1 that travels parallel to the light-absorbing layers 23b.

Figure 19:
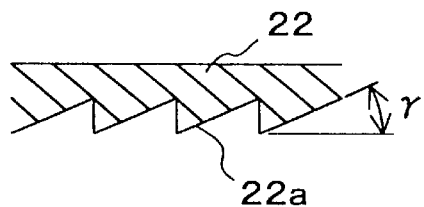
FIG. 19 is a sectional view showing the details of the Fresnel sheet of the liquid crystal display device of the third embodiment.

FIG. 19 is a sectional view showing the details of the Fresnel sheet 22. On the surface of the Fresnel sheet 22 is formed a Fresnel portion 22a having a periodical, sawtooth-shaped pattern. The Fresnel portion 22a is made of a polyester-based hardening resin, and is laid on a base member formed out of a 100 μm thick PET film. In the Fresnel portion 22a, the boundary between two adjacent teeth is formed as a surface perpendicular to the Fresnel sheet 22.

Figure 20:
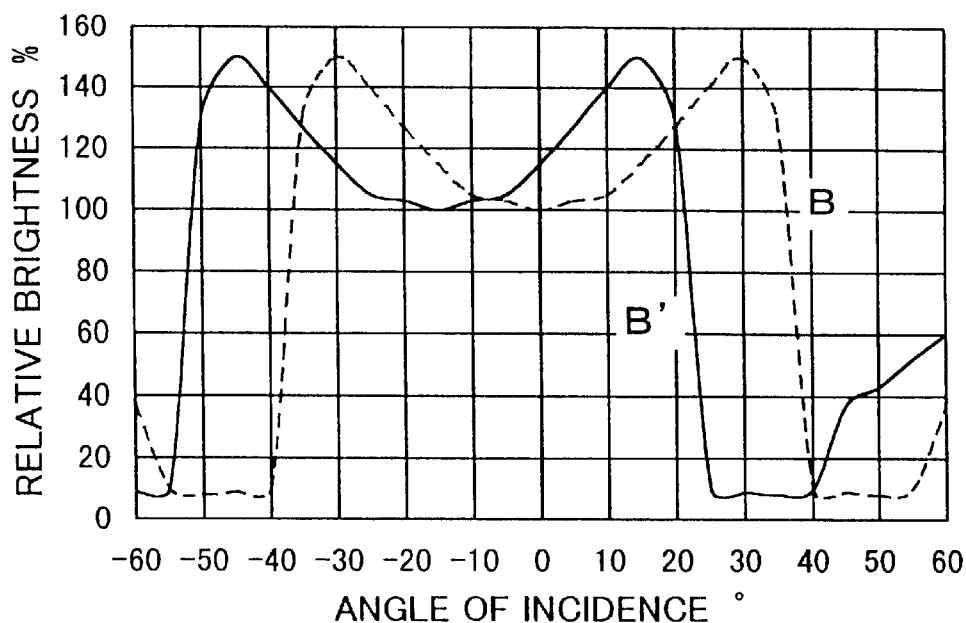
FIG. 20 is a diagram showing the brightness distribution of the light incident on the light shield louver in the liquid crystal display device of the third embodiment.

FIG. 20 shows the brightness distribution of the light incident on the light shield louver 23, i.e. the light emerging from the Fresnel sheet 22. In this figure, the angle of incidence (°) with respect to the light shield louver 23 is taken along the horizontal axis, and the relative brightness (%) is taken along the vertical axis. The prisms 8a of the prism sheet 8 have a vertical angle of 90°, and the light emerging from the prism sheet 8 exhibits, as indicated by a broken line, a brightness distribution symmetrical about the direction normal thereto, i.e. the same brightness distribution as indicated by (B) in FIG. 5. The slant surfaces of the Fresnel sheet 22 are inclined by an angle of γ (see FIG. 19) relative to the direction in which it has the periodic, sawtooth-shaped pattern.

As indicated by (B') in FIG. 20, the light incident on the Fresnel sheet 22 is refracted so that the light emerging therefrom has a brightness distribution that is non-symmetrical about the direction normal thereto but that is substantially symmetrical about a direction about 15° shifted from the normal direction. That is, the Fresnel sheet 22 shifts the average of the angle of incidence of the light incident on the light shield louver 23 (hereinafter, this angle will be referred to as the "average angle of incidence") from 0° to −15°.

Figure 21:
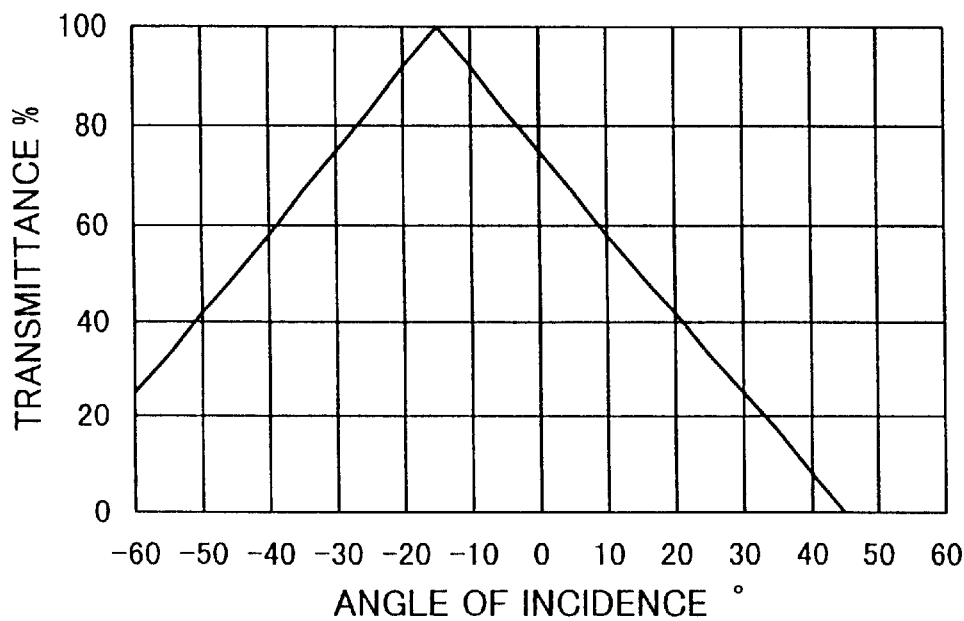
FIG. 21 is a diagram showing the transmittance of the light shield louver of the liquid crystal display device of the third embodiment.

For this reason, the inclination angle β (see FIG. 18) of the light-absorbing layers 23b of the light shield louver 23 is made equal to 15°. Thus, as shown in FIG. 21, the light shield louver 23 exhibits the highest transmittance at an angle of incidence of −15°. The light shield louver 23 here offers a range θ of viewing angles of 120°. In FIG. 21, the transmittance (%) is taken along the vertical axis, and the angle of incidence (°) is taken along the horizontal axis.

Figure 22:
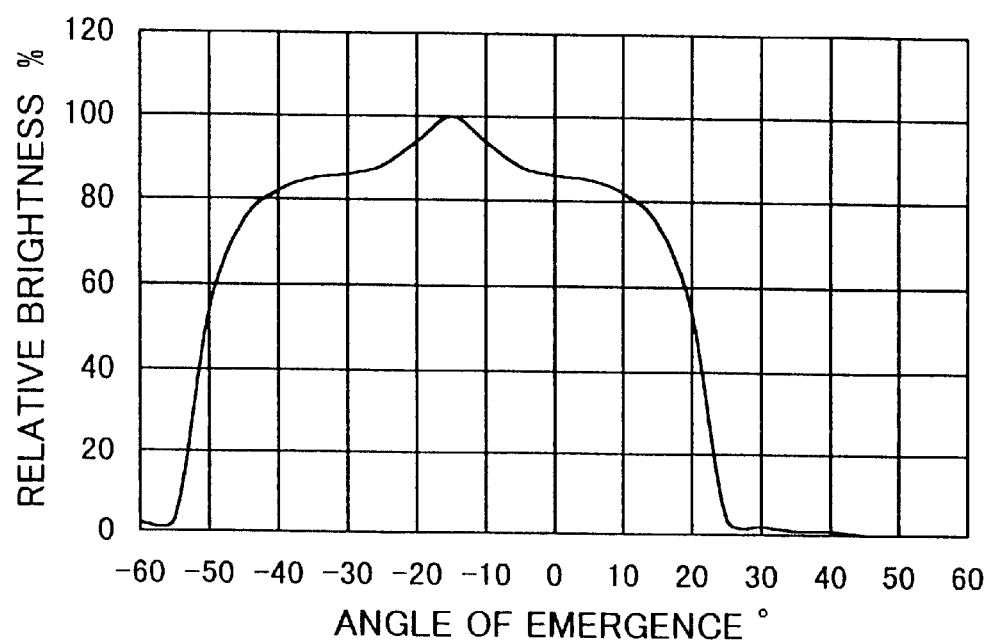
FIG. 22 is a diagram showing the brightness distribution of the light emerging from the light shield louver in the liquid crystal display device of the third embodiment.

As a result, the light emerging from the light shield louver 23 exhibits a brightness distribution as shown in FIG. 22. In FIG. 22, the relative brightness (%) is taken along the vertical axis, and the angle of emergence (°) is taken along the horizontal axis. Outside a range of angles of emergence of −15°±40°, the relative brightness relative to the highest brightness is 5% or less; within a range of angles of emergence of −15°±30°, the relative brightness is about 80% or more.

In this way, it is possible to achieve the same effect as in the first and second embodiments. When the liquid crystal display device 1 of this embodiment is mounted on a car or used in similar applications, there is no need to install it in such a way that the viewer's eyes lie in the direction normal thereto. Even when the liquid crystal display device 1 is installed at different angles, as long as it is provided with a light shield louver 23 and a Fresnel sheet 22 with different inclination angles β and γ (see FIGS. 18 and 19), it is possible to secure high brightness in a predetermined range of angles around the direction in which the viewer's eyes lie. This helps alleviate restrictions on how the liquid crystal display device 1 should be installed in a car or the like and thereby increase flexibility in installation layout.

In the first to third embodiments, the light sources 2 are composed of a plurality of fluorescent lamps. By varying the brightness of the fluorescent lamps, it is possible to reduce the brightness of the light that emerges from the liquid crystal display device 1 outside the desired range of directions of emergence. How this is achieved will be described below taking up the third embodiment as an example. As shown in FIG. 17 described earlier, as the light sources 2, two fluorescent lamps 2a and 2b are arranged in the direction normal to the liquid crystal panel 6 along each of two opposite sides of the light guide plate 3.

The fluorescent lamps 2a and 2b are controlled by an inverter (not shown). The inverter is of a single-DC-input, two-transformer type, and is so configured as to permit adjustment of the duty factor through the operation of a variable resistor. When the input signal from the variable resistor is within a predetermined range, all the fluorescent lamps 2a and 2b are lit to emit their maximum amount of light.

When the input signal from the variable resistor is higher than the upper limit of the predetermined range, the fluorescent lamps 2b farther from the liquid crystal panel 6 are lit to emit their maximum amount of light, and the fluorescent lamps 2a nearer thereto are lit to emit a smaller amount of light according to how high the input signal is. When the input signal from the variable resistor is lower than the lower limit of the predetermined range, the fluorescent lamps 2a nearer to the liquid crystal panel 6 are lit to emit their maximum amount of light, and the fluorescent lamps 2b farther therefrom are lit to emit a smaller amount of light according to how low the input signal is.

Figure 23:
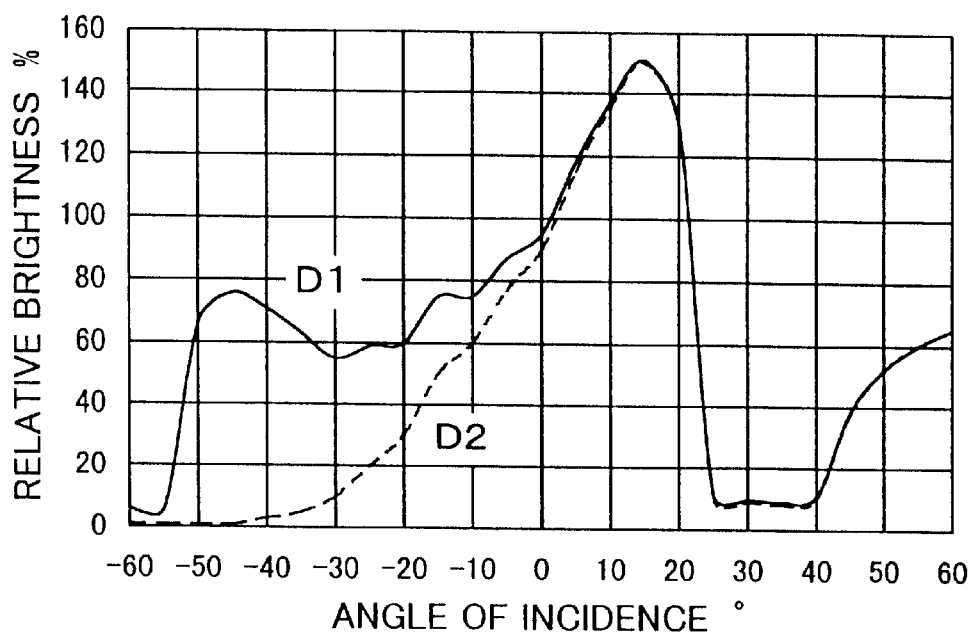
FIG. 23 is a diagram showing the brightness distribution of the light incident on the light shield louver when the amount of light is adjusted in the liquid crystal display device of the third embodiment.

FIG. 23 shows the brightness distribution of the light incident on the light shield louver 23 when the amount of light emitted from the light sources 2 is adjusted. In this figure, the angle of incidence (°) is taken along the horizontal axis, and the relative brightness (%) is taken along the vertical axis. In the figure, D1 indicates a case in which the fluorescent lamps 2a nearer to the light shield louver 23 are lit to emit 50% of the amount of light they emit in the case indicated by B' in FIG. 20 described earlier; D2 indicates a case in which the fluorescent lamps 2a are switched off In either case, the fluorescent lamps 2b farther from the light shield louver 23 are lit to emit their maximum amount of light.

Figure 24:
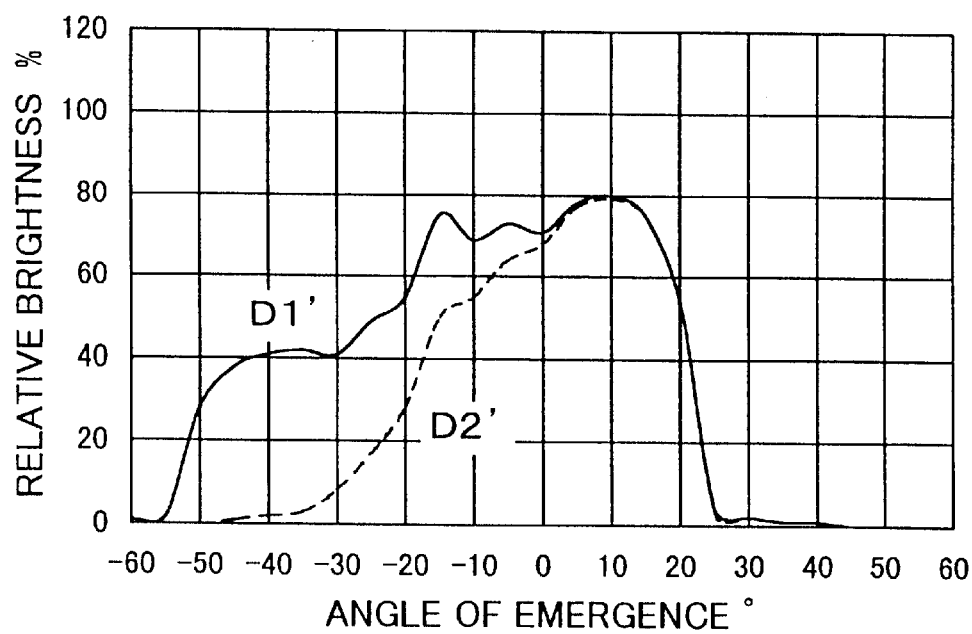
FIG. 24 is a diagram showing the brightness distribution of the light emerging from the light shield louver when the amount of light is adjusted in the liquid crystal display device of the third embodiment.

Since the light shield louver 23 exhibits transmittance as shown in FIG. 21 described earlier, the light emerging from the light shield louver 23 exhibits a brightness distribution as shown in FIG. 24. In this figure, D1' and D2' indicate the cases in which the incident light has a brightness distribution as indicated by D1 and D2, respectively. In the figure, the angle of emergence (°) is taken along the horizontal axis, and the relative brightness (%) is taken along the vertical axis.

In either of these cases, in a range of angles of emergence from 0° to +20°, brightness as high as in the case shown in FIG. 22 in which all the fluorescent lamps 2a and 2b are lit to emit their maximum amount of light is obtained. In this way, it is possible to reduce the amount of light that emerges outside a range of angles of emergence from about 0° to about +20°.

Figure 25:
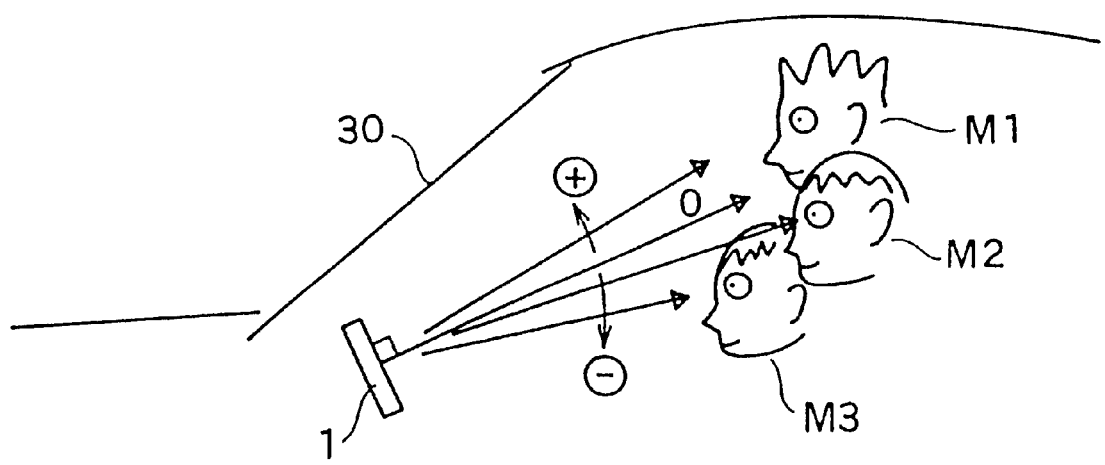
FIG. 25 is a diagram illustrating how the liquid crystal display device of the third embodiment is used when it is mounted on a car.

For example, as shown in FIG. 25, when the liquid crystal display device 1 is mounted on a car 30, as long as the viewer remains the same, he or she typically observes the light emerging therefrom within a narrow range of angles that is determined by his or her sitting height. When the liquid crystal display device 1 is installed at a predetermined angle, a viewer M1 with a high sitting height typically observes the light emerging therefrom within a range of angles of emergence from about 0° to about +20°; a viewer M2 with an average sitting height typically observes the light emerging therefrom within a range of angles of emergence from about 0° to about −20°; a viewer M3 with a low sitting height typically observes the light emerging therefrom within a range of angles of emergence from about −20° to about −40°.

Thus, by adjusting the amount of light emitted from the fluorescent lamps 2a and 2b according to their sitting height, the viewers M1, M2, and M3 can reduce the amount of light that is typically not used for their observation and thereby save the electric power consumed by the liquid crystal display device 1. When the liquid crystal display device 1 is viewed by a plurality of viewers, the fluorescent lamps 2a an 2b are made to emit their maximum amount of light, so that the emerging light exhibits a brightness distribution as shown in FIG. 22 described earlier. This permits the viewers to observe a sharp image in a wide range of angles, and also prevents the image from being projected onto the windshield.

In the first to third embodiments, the liquid crystal panel 6 may be of a so-called semitransparent-reflective type. A liquid crystal panel of a semitransparent-reflective type displays an image by reflecting ambient light when ambient light is available and by transmitting the light emitted from the backlight 7 when no ambient light is available.

The light shield louver 5 or 23 may be disposed either in front of or behind the liquid crystal panel 6. However, when the liquid crystal panel 6 is of a semitransparent-reflective type, disposing the light shield louver 5 or 23 on the exit surface of the liquid crystal panel 6 lowers the efficiency with which the liquid crystal panel 6 takes in ambient light. Therefore, in such a case, it is preferable to dispose the light shield louver 5 or 23 between the liquid crystal panel 6 and the light guide plate 3.

What is claimed is:

1. A backlight comprising:
   a light source;
   a flat-plate-shaped light guide plate for guiding light emitted from the light source in a predetermined direction;
   a light shield louver, disposed so as to face the light guide plate, for shielding part of the light emerging from the light guide plate according to angles of incidence; and
   a converter for converting a brightness distribution of the light incident on the light shield louver into a predetermined brightness distribution,
   wherein the brightness distribution of the light incident on the light shield louver is converted in such a way that brightness at a predetermined angle of incidence within a range from 0° to +90° and brightness at a predetermined angle of incidence within a range from 0° to −90° are higher than brightness at an angle of incidence of 0°.

2. A backlight as claimed in claim 1,
   wherein the brightness distribution of the light incident on the light shield louver is converted in such a way that an angular difference between an angle of incidence at which brightness is highest within a range of angles of incidence from 0° to +90° and an angle of incidence at which brightness is highest within a range of angles of incidence from 0° to 90° is 80° or smaller.

3. A backlight as claimed in claim 2,
   wherein the light shied louver offers a range of viewing angles wider than the angular difference.

4. A backlight as claimed in claim 1,
   wherein the converter is composed of prisms arranged at predetermined intervals.

5. A backlight as claimed in claim 4,
   wherein the light guide plate is composed of a plurality of media having different refractive indices.

6. A backlight as claimed in claim 4,
   wherein an exit surface of the light guide plate is formed as a non-glossy surface.

7. A backlight as claimed in claim 4,
   wherein the prisms are disposed between the light shield louver and the light guide plate.

8. A backlight as claimed in claim 4,
   wherein the prisms have a vertical angle of 30° to 110°.

9. A backlight as claimed in claim 4,
   wherein the prisms are so shaped as to have a radius of 10 $\mu$m or smaller as measured in a section at a vertex thereof.

10. A backlight as claimed in claim 1,
    wherein the converter is composed of prism-shaped concave pits formed in a back surface of the light guide plate, and a diffuser for diffusing light is provided between the light shield louver and the light guide plate.

11. A backlight as claimed in claim 10,
    wherein the pits have an acute vertical angle.

12. A backlight as claimed in claim 10,
    wherein the diffuser is composed of a sheet-shaped member having a haze value of 15% to 70%.

13. A backlight as claimed in claim 1,
    wherein the light source emits varying amounts of light according to directions of emergence.

14. A backlight as claimed in claim 13,
    wherein the light source is composed of a plurality of fluorescent lamps, and is furnished with an inverter that, through adjustment of a duty factor, permits amounts of light emitted from particular fluorescent lamps to be adjusted.

15. A backlight comprising:
    a light source;
    a flat-plate-shaped light guide plate for guiding light emitted from the light source in a predetermined direction;
    a light shield louver, disposed so as to face the light guide plate for shielding part of the light emerging from the light guide plate according to angles of incidence; and
    a converter for converting a brightness distribution of the light incident on the light shield louver into a predetermined brightness distribution,
    wherein the converter shifts an average direction of incidence of the light incident on the light shield louver from a direction normal to the light shield louver.

16. A backlight as claimed in claim 15,
wherein the converter has a Fresnel sheet having a sawtooth-shaped section.

17. A backlight as claimed in claim 16,
wherein the Fresnel sheet is formed by laying a polyester-based hardening resin member having a sawtooth-shaped section on a polyethylene terephthalate film.

18. A backlight as claimed in claim 15,
wherein the brightness distribution of the light incident on the light shield louver is converted in such a way that brightness at a predetermined angle of incidence in a positive direction relative to an average angle of incidence and brightness at a predetermined angle of incidence in a negative direction relative to the average angle of incidence are higher than brightness at the average angle of incidence.

19. A backlight as claimed in claim 18,
wherein the converter has prisms arranged at predetermined intervals.

20. A backlight as claimed in claim 15,
wherein the light shield louver has light-absorbing layers arranged with an inclination.

21. A backlight as claimed in claim 15,
wherein the light source emits varying amounts of light according to directions of emergence.

22. A backlight as claimed in claim 21,
wherein the light source is composed of a plurality of fluorescent lamps, and is furnished with an inverter that, through adjustment of a duty factor, permits amounts of light emitted from particular fluorescent lamps to be adjusted.

23. A liquid crystal display device comprising:
a backlight comprising:
a light source;
a flat-plate-shaped light guide plate for guiding light emitted from the light source in a predetermined direction;
a light shield louver, disposed so as to face the light guide plate, for shielding part of the light emerging from the light guide plate according to angles of incidence; and
a converter for converting a brightness distribution of the light incident on the light shield louver into a predetermined brightness distribution; and
a liquid crystal panel that displays an image by transmitting the light emerging from the backlight,
wherein the brightness distribution of the light incident on the light shield louver is converted in such a way that brightness at a predetermined angle of incidence within a range from 0° to +90° and brightness at a predetermined angle of incidence within a range from 0° to −90° are higher than brightness at an angle of incidence of 0°.

24. A liquid crystal display device as claimed in claim 23,
wherein the light shield louver is disposed between the liquid crystal panel and the light guide plate.

25. A liquid crystal display device comprising:
a backlight comprising:
a light source;
a flat-plate-shaped light guide plate for guiding light emitted from the light source in a predetermined direction;
a light shield louver, disposed so as to face the light guide plate, for shielding part of the light emerging from the light guide plate according to angles of incidence; and
a converter for converting a brightness distribution of the light incident on the light shield louver into a predetermined brightness distribution; and
a liquid crystal panel that displays an image by transmitting the light emerging from the backlight,
wherein the converter shifts an average direction of incidence of the light incident on the light shield louver from a direction normal to the light shield louver.

26. A liquid crystal display device as claimed in claim 25,
wherein the light shield louver is disposed between the liquid crystal panel and the light guide plate.

27. A liquid crystal display device comprising:
a backlight comprising:
a light source;
a flat-plate-shaped light guide plate for guiding light emitted from the light source in a predetermined direction;
a light shield louver, disposed so as to face the light guide plate, for shielding part of the light emerging from the light guide plate according to angles of incidence; and
a converter for converting a brightness distribution of the light incident on the light shield louver into a predetermined brightness distribution; and
a liquid crystal panel that displays an image by transmitting the light emerging from the backlight,
wherein the converter performs conversion in such a way that light emerging from the light shield louver exhibits a brightness distribution such that, assuming that brightness at an angle of emergence of 0° is X and an absolute value of an angle of emergence at which brightness is 0.1X is $\alpha$, brightness at an angle of incidence of which an absolute value is $\alpha/2$ is 0.55X or higher.

* * * * *